(12) United States Patent
Knudson et al.

(10) Patent No.: US 9,595,059 B2
(45) Date of Patent: Mar. 14, 2017

(54) IMAGE-RELATED METHODS AND ARRANGEMENTS

(71) Applicants: Edward B Knudson, Lake Oswego, OR (US); Tony F Rodriguez, Portland, OR (US)

(72) Inventors: Edward B Knudson, Lake Oswego, OR (US); Tony F Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 14/109,450

(22) Filed: Dec. 17, 2013

(65) Prior Publication Data

US 2014/0222612 A1    Aug. 7, 2014

Related U.S. Application Data

(63) Continuation of application No. 13/684,093, filed on Nov. 21, 2012, now Pat. No. 8,620,021, and a
(Continued)

(51) Int. Cl.
*G06Q 30/00* (2012.01)
*G06Q 30/06* (2012.01)
(Continued)

(52) U.S. Cl.
CPC ......... *G06Q 30/0631* (2013.01); *G06Q 30/00* (2013.01); *G06Q 50/01* (2013.01); *H04M 1/0264* (2013.01); *H04M 1/0266* (2013.01)

(58) Field of Classification Search
CPC .... G06Q 30/00; G06Q 30/0631; G06Q 50/01; G06T 1/0021
See application file for complete search history.

(56) References Cited

U.S. PATENT DOCUMENTS 5,899,700 A    5/1999   Williams et al.
5,902,353 A    5/1999   Reber et al.
(Continued)

FOREIGN PATENT DOCUMENTS

WO    WO2013/149267    10/2013

OTHER PUBLICATIONS

"Yelp 2.0 monocle and checkins to its Android Client" by Hildenbrand, 2010.*
(Continued)

*Primary Examiner* — Utpal Shah
(74) *Attorney, Agent, or Firm* — Digimarc Corporation

(57) ABSTRACT

A user captures an image of a retail product with a smartphone. Product recommendations associated with the retail product are provided to the smartphone. One claim recites a method comprising: receiving first imagery captured by a smartphone camera, the first imagery representing a first retail product located at a retail location, and presenting the first imagery on a screen of the smartphone; providing the first imagery to a processor to produce fingerprint data therefrom, the fingerprint data being utilized to identify the first retail product; receiving second imagery representing a second retail product, identified as a product recommendation associated with the first retail product, the second imagery being sourced from a source different than the smartphone camera; presenting, on the screen of the smartphone, the second imagery; receiving user input via a touch screen of the smartphone; as a consequence of said user input, initiating an action. Of course, a great variety of other claims, features and arrangements are also detailed.

24 Claims, 23 Drawing Sheets

Related U.S. Application Data continuation-in-part of application No. 13/433,870, filed on Mar. 29, 2012.

(60) Provisional application No. 61/624,037, filed on Apr. 13, 2012, provisional application No. 61/637,097, filed on Apr. 23, 2012, provisional application No. 61/643,084, filed on May 4, 2012, provisional application No. 61/653,985, filed on May 31, 2012, provisional application No. 61/673,692, filed on Jul. 19, 2012.

(51) Int. Cl.
*G06Q 50/00* (2012.01)
*H04M 1/02* (2006.01)

(56) References Cited

U.S. PATENT DOCUMENTS

| | | | |
|---|---|---|---|
| 5,933,829 A | | 8/1999 | Durst |
| 6,556,690 B1 | | 4/2003 | Nelson |
| 6,577,746 B1 | | 6/2003 | Evans et al. |
| 6,590,996 B1 | | 7/2003 | Reed et al. |
| 6,711,293 B1 | | 3/2004 | Lowe |
| 6,788,293 B1 | | 9/2004 | Silverbrook et al. |
| 6,947,571 B1 * | | 9/2005 | Rhoads et al. ............. 382/100 |
| 6,965,682 B1 | | 11/2005 | Davis |
| 7,206,820 B1 | | 4/2007 | Rhoads et al. |
| 7,397,607 B2 | | 7/2008 | Travers |
| 7,578,442 B2 | | 8/2009 | Knowles et al. |
| 7,876,266 B2 | | 1/2011 | Rhoads |
| 7,958,081 B2 * | | 6/2011 | Fitzpatrick et al. |
| 7,983,185 B2 | | 7/2011 | Rhoads et al. |
| 8,098,938 B1 | | 1/2012 | Buddemeier et al. |
| 8,108,484 B2 | | 1/2012 | Rhoads et al. |
| 8,300,262 B2 | | 10/2012 | Lapstun et al. |
| 8,751,316 B1 * | | 6/2014 | Fletchall et al. ............. 705/20 |
| 8,831,384 B2 * | | 9/2014 | Wo et al. ............. 382/305 |
| 2001/0011233 A1 | | 8/2001 | Narayanaswami |
| 2004/0208372 A1 | | 10/2004 | Boncyk et al. |
| 2005/0195128 A1 | | 9/2005 | Sefton |
| 2005/0213790 A1 * | | 9/2005 | Rhoads et al. ............. 382/100 |
| 2006/0026140 A1 | | 2/2006 | King et al. |
| 2006/0085477 A1 | | 4/2006 | Phillips et al. |
| 2006/0218192 A1 | | 9/2006 | Gopalakrishnan |
| 2006/0218193 A1 | | 9/2006 | Gopalakrishnan |
| 2006/0230073 A1 | | 10/2006 | Gopalakrishnan |
| 2007/0036469 A1 | | 2/2007 | Kim et al. |
| 2007/0058858 A1 * | | 3/2007 | Harville et al. ............. 382/165 |
| 2007/0156726 A1 | | 7/2007 | Levy et al. |
| 2008/0062141 A1 | | 3/2008 | Chandhri |
| 2008/0066016 A1 | | 3/2008 | Dowdy et al. |
| 2008/0122796 A1 | | 5/2008 | Jobs et al. |
| 2008/0133336 A1 | | 6/2008 | Altman et al. |
| 2008/0162474 A1 | | 7/2008 | Thong et al. |
| 2008/0174570 A1 | | 7/2008 | Jobs et al. |
| 2008/0301304 A1 | | 12/2008 | Chitsaz |
| 2009/0002335 A1 | | 1/2009 | Chaudhri |
| 2009/0189830 A1 | | 7/2009 | Deering et al. |
| 2009/0213828 A1 | | 8/2009 | Brundage et al. |
| 2009/0285492 A1 | | 11/2009 | Ramanujapuram et al. |
| 2009/0319388 A1 | | 12/2009 | Yuan et al. |
| 2010/0048242 A1 * | | 2/2010 | Rhoads ............. G06F 17/30244 455/556.1 |
| 2010/0103277 A1 | | 4/2010 | Leebow |
| 2010/0150434 A1 | | 6/2010 | Reed |
| 2010/0174599 A1 | | 7/2010 | Rosenblatt et al. |
| 2010/0211794 A1 | | 8/2010 | Bilobrov |
| 2010/0228632 A1 | | 9/2010 | Rodriguez |
| 2010/0260426 A1 | | 10/2010 | Huang et al. |
| 2010/0318423 A1 | | 12/2010 | Kanigsberg et al. |
| 2011/0029370 A1 | | 2/2011 | Roeding et al. |
| 2011/0034176 A1 | | 2/2011 | Lord et al. |
| 2011/0072015 A1 | | 3/2011 | Lin et al. |
| 2011/0106630 A1 | | 5/2011 | Hegeman et al. |
| 2011/0125735 A1 | | 5/2011 | Petrou et al. |
| 2011/0129153 A1 | | 6/2011 | Petrou et al. |
| 2011/0131241 A1 | | 6/2011 | Petrou et al. |
| 2011/0145068 A1 | | 6/2011 | King et al. |
| 2011/0145093 A1 * | | 6/2011 | Paradise et al. ............. 705/26.41 |
| 2011/0148628 A1 | | 6/2011 | Goto |
| 2011/0153417 A1 | | 6/2011 | Bernosky |
| 2011/0154174 A1 | | 6/2011 | Liu et al. |
| 2011/0158558 A1 | | 6/2011 | Zhao et al. |
| 2011/0161076 A1 | | 6/2011 | Davis et al. |
| 2011/0161443 A1 | | 6/2011 | Fahn et al. |
| 2011/0164047 A1 | | 7/2011 | Pance |
| 2011/0164163 A1 | | 7/2011 | Bilbrey et al. |
| 2011/0188742 A1 | | 8/2011 | Yu et al. |
| 2011/0196859 A1 | | 8/2011 | Mei |
| 2011/0212717 A1 | | 9/2011 | Rhoads et al. |
| 2011/0264700 A1 | | 10/2011 | Mei et al. |
| 2011/0289532 A1 | | 11/2011 | Yu et al. |
| 2011/0292078 A1 | | 12/2011 | Lapstun et al. |
| 2012/0008821 A1 | | 1/2012 | Sharon et al. |
| 2012/0033876 A1 | | 2/2012 | Momeyer et al. |
| 2012/0041973 A1 * | | 2/2012 | Kim et al. ............. 707/769 |
| 2012/0077542 A1 | | 3/2012 | Rhoads |
| 2012/0083294 A1 * | | 4/2012 | Bray et al. ............. 455/466 |
| 2012/0218444 A1 | | 8/2012 | Stach |
| 2012/0224743 A1 | | 9/2012 | Rodriguez et al. |
| 2012/0229647 A1 * | | 9/2012 | Calman et al. ............. 348/158 |
| 2012/0231424 A1 * | | 9/2012 | Calman et al. ............. 434/72 |
| 2012/0232937 A1 * | | 9/2012 | Calman et al. ............. 705/4 |
| 2012/0233003 A1 * | | 9/2012 | Calman et al. ............. 705/16 |
| 2012/0284012 A1 | | 11/2012 | Rodriguez et al. |
| 2013/0035081 A1 * | | 2/2013 | Sanger ............. 455/414.2 |
| 2013/0166193 A1 * | | 6/2013 | Goldman ............. G01C 21/206 701/410 |
| 2013/0259297 A1 | | 10/2013 | Knudson |

OTHER PUBLICATIONS

PCT International Search Report and Written Opinion of the International Searching Authority, in PCT/US2013/036102 (published as WO 2013/149267), mailed Sep. 10, 2013.

PCT International Preliminary Report on patentability, in PCT/US2013/036102 (published as WO 2013/149267), Oct. 1, 2014.

Nakamura, Takao and Katayama, Atsushi and Yamamuro, Masashi and Sonehara, Noboru, "Fast watermark detection scheme for camera-equipped cellular phone", Proceedings of the 3rd international conference on Mobile and ubiquitous multimedia, MUM '04, 2004.

Allan Hoffman, "QR codes bring 'quick response' links using smartphone barcode apps" Oct. 7, 2010. http://www.nj.com/business/index.ssf/2010/10/qr.sub.--codes.sub.--bring.s-ub.--quick.sub.--response.html.

Heidi Tolliver-Nigro "Make Money with QR Codes", 2011. http://www.ipex.org/files/make.sub.--money.pdf.

Jason Coleman, "QR Codes: What Are They and Why Should You Care?", 2011.

Tony Rodriguez, Eliot Rogers and Adnan Alattar, "Evolution of Middleware to Support Mobile Discovery", (date Unknown), 2011.

"Digimarc MediaBridge Reader Software Expands Reach," Digimarc Press Release, 2000.

"Popular Mechanics Magazine First to Use Digimarc MediaBridge to Link Editorial Content to Web Site," Digimarc Press Release, 2000.

Perry et al, Digimarc MediaBridge—The Birth of a Consumer Product, from Concept to Commercial Application, Proc. SPIE 4675, 2002.

Rodriquez et al., "Evolution of Middleware to Support Mobile Discovery," Presented at the MobiSense Workshop/Pervasive on Jun. 12, 2011.

Neven et al, "Image Recognition with an Adiabatic Quantum Computer I. Mapping to Quadratic Unconstrained Binary Optimization," Arxiv preprint arXiv:0804.4457, Apr. 2008.

* cited by examiner

YOU GET IT ALL: WELCOME COMFORT, TIMELESS STYLING.

New Archer Footwear Collection & Freemont Driving Moc. Office hours or off hours, these classics fit in anywhere. Thanks to cushioning, they feel great too. Imported. Colors, below. Suede upper. Cushioned insole. Suede/cotton lining. Leather welt. Rubber sole with shock-absorbing "nubs"
  C. New! Classic Suede Wingtip ☑ CROP EDGES TO FILL? or
☐ MAINTAIN ASPECT RATIO?

☐ CROP EDGES TO FILL? or
☑ MAINTAIN ASPECT RATIO?

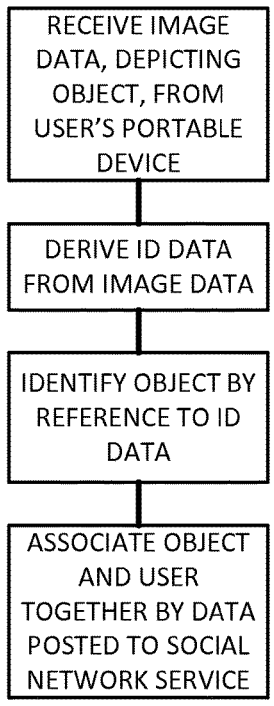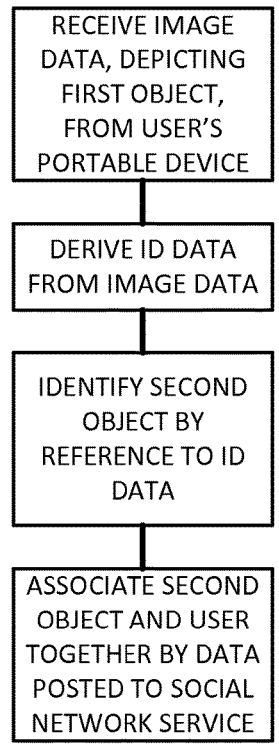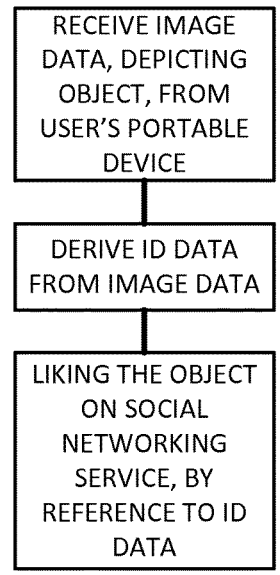
FIG. 18  FIG. 19  FIG. 20
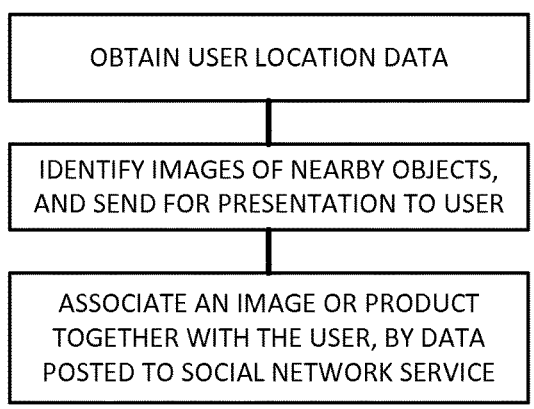
FIG. 21

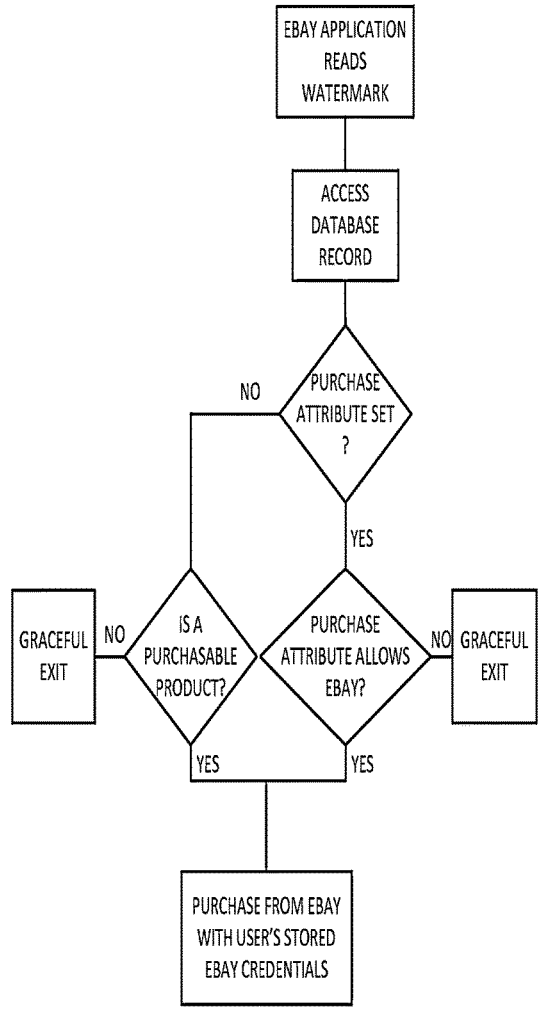
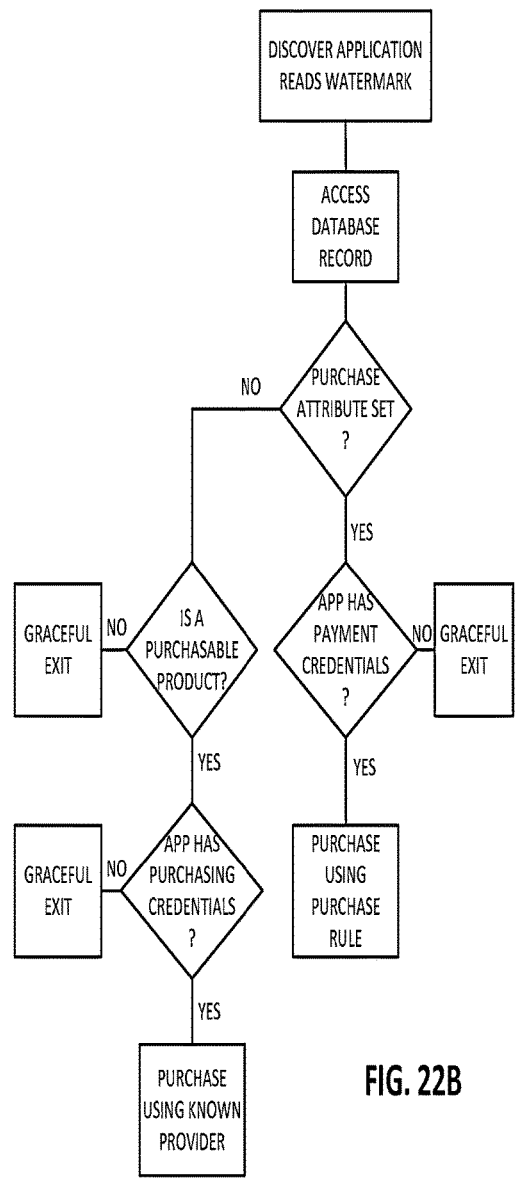
FIG. 22A
FIG. 22B

| WM PAYLOAD | PURCHASE ATTRIBUTE DATA | NAME TEXT | CLASS | PRODUCT IDENTIFIER(S) | WEB LINK FOR PRODUCT INFO | WEB LINK FOR PRODUCT PURCHASE | ... |
|---|---|---|---|---|---|---|---|
| 43DF8A | AMAZON | SONY MDR210 HEADPHONES | ELECTRONICS | EAN-13: 0027242463530 | WWW.SONY.COM/MDR210LP | WWW.AMAZON.COM/DP/B004P6C2CE/ | ... |
| 8AC334 | EBAY | CHANEL ALLURE PERFUME | OTHER | EAN-13: 3145891124606 | WWW.CHANEL.COM/EN_US/FRAGRANCE-BEAUTY/FRAGRANCE-ALLURE-88288 | WWW.EBAY.COM/SCH/?_NKW=CHANEL%20ALLURE%20PERFUME | ... |
| B163A4 | | KLEENEX AUTO PACK TISSUES | HOUSEHOLD | UPC-A: 0036000140675 | WWW.KLEENEX.COM/EVERYDAYTISSUE.ASPX | | ... |
| C4FF31 | | NATIONAL GEOGRAPHIC – EGYPT IN THE MOMENT, MAY 2012 | | | NGM.NATIONALGEOGRAPHIC.COM/2012/05/NILE-JOURNEY/BARTHOLET-TEXT | | ... |
| 75A636 | AMAZON | WILSON BLACKTOP WARRIOR BASKETBALL | OTHER | EAN-13: 0026388240708 | WWW.WILSON.COM/EN-US/BASKETBALL/BALLS/BLACKTOP-WARRIOR/ | WWW.AMAZON.COM/WILSON-BLACKTOP-WARRIOR-BASKETBALL-ORANGE/DP/B001URVJ0W/ | ... |

FIG. 23

|  | BOOKS | MOVIES | GROCERIES | HOUSEHOLD | ELECTRONICS | OTHER |
|---|---|---|---|---|---|---|
| CHOICE #1 | KINDLE | ITUNES | SAFEWAY | TARGET | BESTBUY | EBAY |
| CHOICE #2 | HALF | NETFLIX | AMAZON | AMAZON | EBAY | AMAZON |
| CHOICE #3 | ABEBOOKS | AMAZON | EBAY | WALMART | AMAZON | WALMART |
| CHOICE #4 | AMAZON | BESTBUY |  |  |  |  |

FIG. 24A

| VENDOR | URL | LOGIN | PASSWORD | PAYMENT |
|---|---|---|---|---|
| KINDLE | WWW.AMAZON.COM/KINDLE-EBOOKS/ | JohnSmithPDX | We^&5 | ONE-CLICK (USING VISA) |
| HALF | WWW.HALF.COM | johnsmithpdx | Kf*%^2 | PAYPAL |
| ABEBOOKS | WWW.ABEBOOKS.COM | jsmith97@well.com | Hs)8%$ | MASTERCARD |
| AMAZON | WWW.AMAZON.COM | JohnSmithPDX | We^&5 | ONE-CLICK (USING VISA) |
| BESTBUY | WWW.BESTBUY.COM | Jsmith97@well.com | Os53&2 | PROMPT |

FIG. 24B

IMAGE-RELATED METHODS AND ARRANGEMENTS

RELATED APPLICATION DATA

This application is a continuation of U.S. patent application Ser. No. 13/684,093, filed Nov. 21, 2013 (U.S. Pat. No. 8,620,021), which claims priority to U.S. Provisional Application Nos. 61/624,037, filed Apr. 13, 2012, 61/637,097, filed Apr. 23, 2012, 61/643,084, filed May 4, 2012, 61/653, 985, filed May 31, 2012, and 61/673,692, filed Jul. 19, 2012. The Ser. No. 13/684,093 application is also a continuation-in-part of U.S. patent application Ser. No. 13/433,870, filed Mar. 29, 2012 (published as US 2013-0259297 A1).

BACKGROUND AND SUMMARY

Social networks are widely used to share information among friends. Increasingly, friends share indications that they "like" particular content, such as web pages, songs, etc.

The present disclosure concerns, in some respects, extending concepts of social networks and "liking" to the realm of physical objects (such as may be encountered in retail stores), through the use of smartphone cameras.

In one particular embodiment, shopper Alice comes across a favorite cookie mix in the supermarket. Her friends raved about the cookies at a recent neighborhood get-together, and she wants to share the secret. With her smartphone, Alice takes a picture of the packaged mix, and an associated smartphone app gives her the option of "Liking" the product on Facebook.

When she selects this option, the image is analyzed to derive identification data (e.g., by extracting an image fingerprint, or by decoding an invisible digital watermark). This identification data is passed to a database, which determines the item to which it corresponds. An entry is then made to Alice's Facebook profile, indicating she "Likes" the product (in this case, a package of Bob's Red Mill brand gluten free shortbread cookie mix). A corresponding notation instantly appears in her friends' Facebook news feeds.

In some arrangements, the app gives the shopper the opportunity to explore, review, and "like," related items, such as other products of the same brand. For example, by information presented by the app, Alice may discover that Bob's Red Mill also offers a gluten-free vanilla cake mix. Pleased with her experience with the cookie mix, she decides to try a package of the cake mix for her son's upcoming birthday. Finding it out of stock on the grocery shelf, Alice selects another option on her smartphone app—electing to purchase the item from Amazon (shipping is free with her Amazon Prime account).

In another aspect, the present technology is used to share images via social networks, such as on Pinterest.

Pinterest is an online service that enables people to share images they find on the web. Users compile collections of images (pinboards, or galleries), which are typically grouped by a common subject (e.g., vases) or theme (e.g., red items).

In an exemplary scenario, Ted has a fascination for rakes. He has a Pinterest pinboard where he collects images depicting the variety of rakes he's found on the web. While on an errand looking for something else, he happens across a "carpet rake" at the mall department store. Intrigued, he uses his smartphone to snap an image of the barcode label found on the product's handle.

A smartphone app gives him an option of posting to his Pinterest account. While the barcode, per se, has no appeal, the app automatically decodes the barcode and presents a gallery of product photos associated with the barcode identifier. Moreover, the app presents images of other carpet rakes. (Who knew there could be such diversity in carpet rakes?) Ted selects several of the product photos with a few taps, and a moment later they are all posted to his rakes pinboard on Pinterest.

In a related embodiment, Pat is reading House Beautiful magazine, and sees a picture of a lamp she likes. With her smartphone she captures an image from the magazine page. An app on the smartphone recognizes the image as having been published in the April, 2012, issue (e.g., by a steganographic watermark in the image), and takes Pat to the House Beautiful pinboard for April on Pinterest. There she can click a single button to re-pin the lamp image to one of her own pinboards. While there, she scans the other House Beautiful photos on Pinterest, and picks a few others for re-pinning too.

The present technology spans a great number of other features and implementations; the foregoing is just a small sampling.

BRIEF DESCRIPTION OF THE DRAWINGS

FIGS. 18-21 are flowcharts detailing methods according to certain aspects of the present technology.

FIGS. 22A and 22B are flowcharts of exemplary methods according to certain aspects of the present technology.

FIG. 23 is an excerpt from an exemplary data structure associating watermark payloads with corresponding metadata.

FIGS. 24A and 24B are exemplary data structures used in certain implementations of the present technology.

DETAILED DESCRIPTION

Introduction

The term "social network service" (and the like) is used in this disclosure with its ordinary meaning, e.g., an online service, platform, or site that focuses on building and reflecting social networks or social relations among people, who share, for example, interests, activities or other affiliation. A social network service typically includes a representation of each user (often a profile), his/her social links, and a variety of additional services. Most contemporary social network services are web-based and provide means for users to interact over the Internet, such as by public and/or private messaging, and by sharing photos.

Examples of popular social network services include Facebook, Pinterest, Flickr, Google+ and LinkedIn, although different services will doubtless become popular in the future.

Many social networking services provide features allowing users to express affinity for certain content (e.g., status updates, comments, photos, links shared by friends, websites and advertisements). On Facebook, this takes the form of a "Like Button," which is activated by a user to indicate they "like" associated content. The concept is present, with different names, in other social networking sites. For example, Google has a "+1" button, and Twitter has a "Follow" button. For expository convenience, this concept is referenced herein by the un-capitalized term "liking." (As actually manifested on most social networking services, "liking" involves storing—and commonly displaying—data reflecting a user's affinity for an item.)

Figure 1:
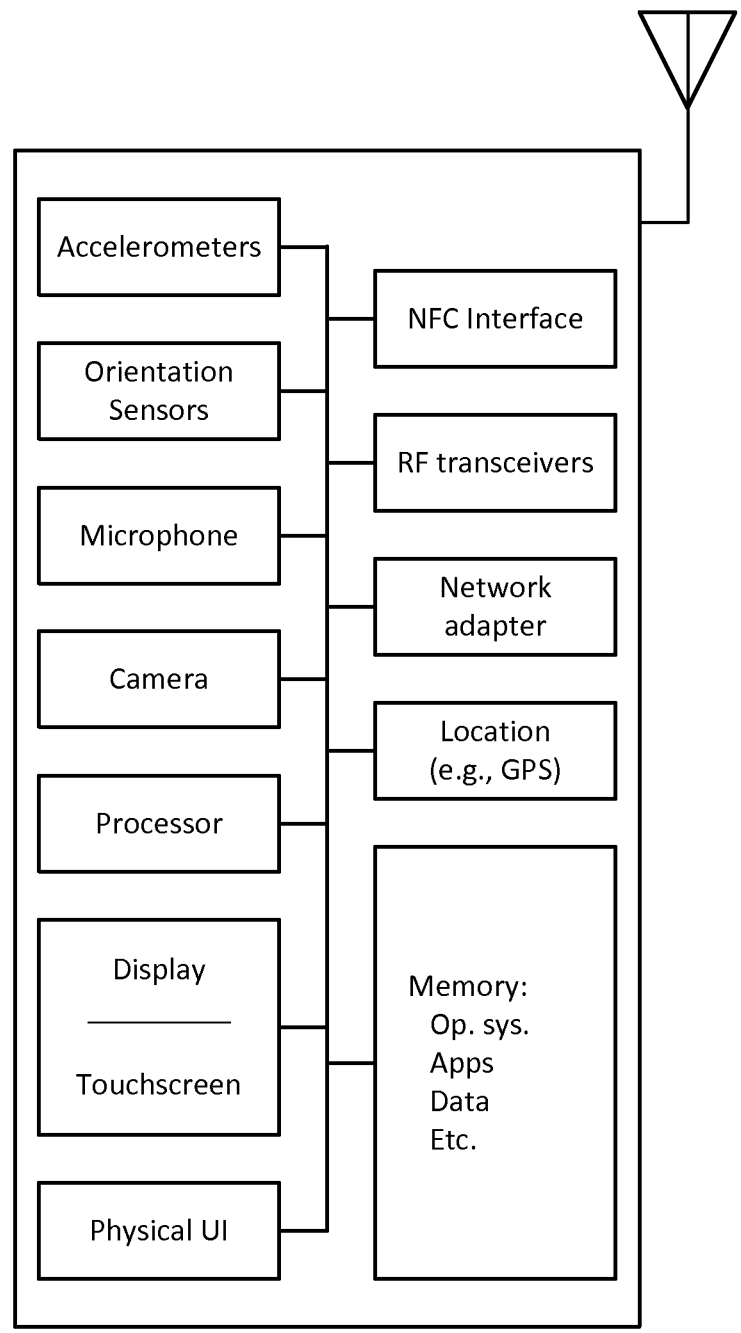
FIG. 1 is a block diagram of a smartphone, which can be used in embodiments of the present technology.

As indicated earlier, implementations of the present technology commonly involve imagery captured by a user's smartphone. FIG. 1 shows a block diagram of a representative smartphone, including a camera, a processor, a memory, and a wireless interface.

The camera portion includes a lens, an autofocus mechanism, and a sensor (not particularly shown), which cooperate to provide image data corresponding to an object imaged by the camera. This image data is typically stored in the smartphone memory. Also stored in the smartphone memory are instructions, including operating system software and app software, which are used to process the image data.

In the depicted smartphone, these software instructions process the image data to extract or derive image-identifying data from the image data. Various such arrangements are known, including digital watermarking and image fingerprinting approaches.

Once image-identifying data has been extracted, it is referred to a data structure (typically a database at a remote server), which uses the extracted data to obtain additional information about the image, or about the object depicted in the image. If the identification data is an extracted digital watermark payload, it is looked-up in the database to access a store of metadata associated with the image/object. If the identification data is image fingerprint data, a database search is conducted to identify closest-matching reference fingerprint data. Again, based on this operation, a store of metadata associated with the image/object is accessed. Among the accessed metadata is typically a textual description of the object (e.g., "Bob's Red Mill brand gluten free shortbread cookie mix"). Additional metadata may include a UPC code, a product weight, and information about associated online payoffs (i.e., responsive behaviors)—such as a URL that should be followed to present a related video, etc. In the case of a photograph found in a magazine, the metadata may identify the copyright owner, and specify prices for different reproduction/use licenses.

In an illustrative embodiment, the smartphone app additionally acts to associate the object with the user, via a data posted to a social network service. In particular, the app may upload the image to the user's Facebook or Pinterest account. Thus, the user-captured image will appear in news-feeds of the user's Facebook friends, or on a user pinboard published by Pinterest.

As noted earlier, imagery from one product may allow the system to identify different imagery of the same product, or of different (but related) products.

If the user captures an image of a cookie mix in a supermarket, and the system identifies the product from its visual features (watermark or fingerprint), the system can use this knowledge to then locate alternative pictures of the same product. These alternate pictures may be presented to the user on the smartphone—providing the user the opportunity to post one or more of these alternate images to the social networking service (either instead of, or in addition to, the user-captured image). Thus, instead of a slightly blurry, ill-lit snapshot of cookie mix captured by the user in the grocery aisle, the social networking service may instead be provided a marketing photo of the product, e.g., from the Bob's Red Mill company's web site (or a hyperlink to such an image).

Knowing the identity of the object photographed by the user, the system can similarly identify related objects, and related images. The relationship can be of various types, e.g., products from the same company (e.g., Coke soft drink and Dasani bottled water), similar products from different companies (Jimmy Choo biker boots and Steve Madden Banddit boots), etc. Product recommendation software, such as is used by Amazon and other retailers, can be used to identify other items that may be of interest to a person who photographs a particular product. (Exemplary recommendation systems are detailed, e.g., in Amazon's U.S. Pat. No. 8,032,506 and in 4-Tell's patent publication 20110282821.)

This aspect of the present technology thus can provide the user with imagery, or other information, about these related products. The user may then elect to post any of this information to their social networking service account (or "like" the depicted items).

Figure 2:
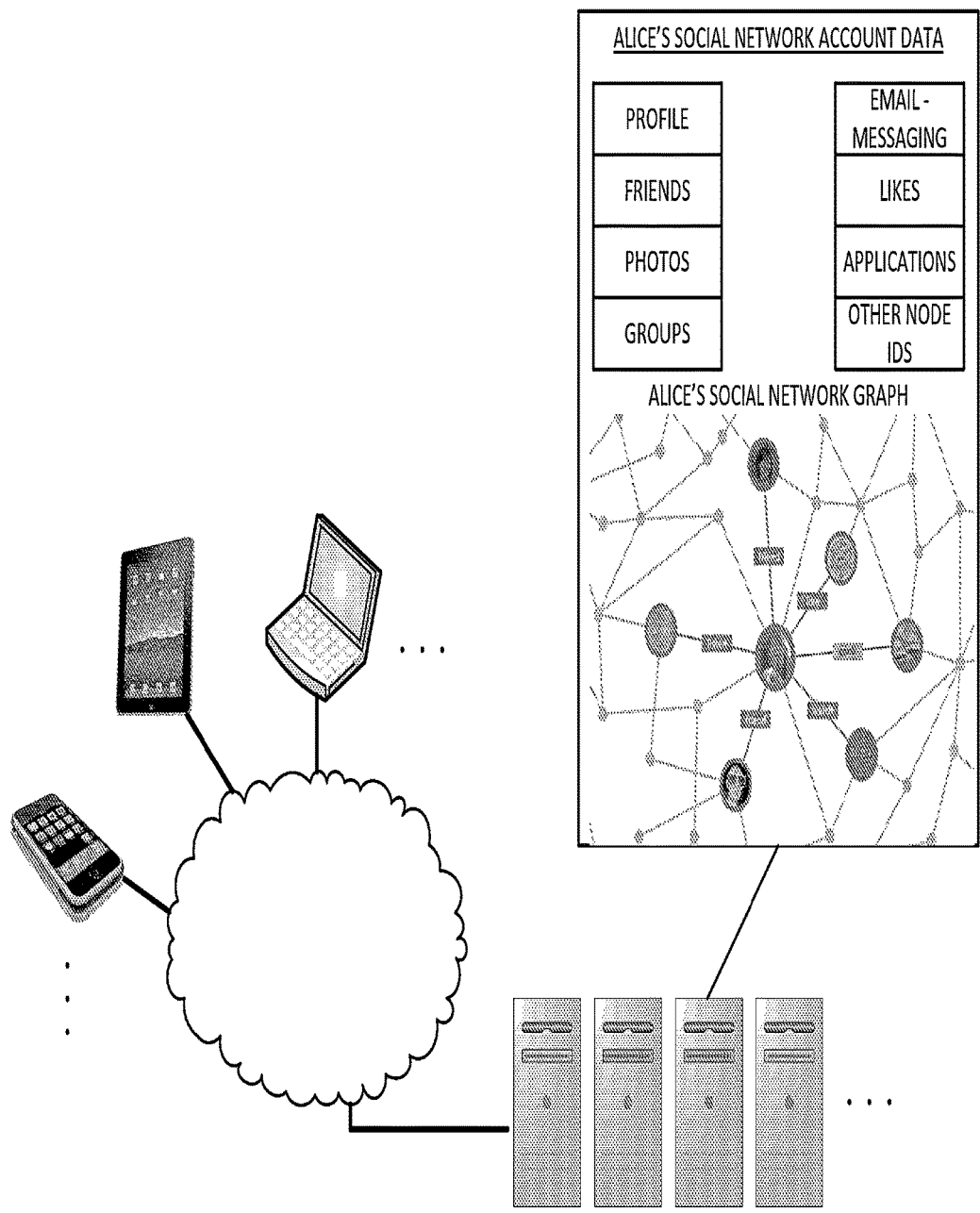
FIG. 2 is a diagram of a computing environment in which the present technology can be utilized.

FIG. 2 provides a view of a larger system. On the left are the client devices (tablets, smartphones, laptops), by which users access their social network accounts, and by which they may take pictures of items of interest. These devices connect to the internet, which links them to a bank of servers, e.g., at the social network site. These servers contain the programming instructions that implement the social network functionality. These servers also contain the data associated with each user's account.

A graphical depiction of Alice's social network account is shown on the right of FIG. 2. Her account comprises a collection of data including profile information (name, town, age, gender, etc.), and information concerning friends, photos, groups, emails, likes, applications, etc. Much of this data is not literal text (e.g., friends' names), but rather comprises unique numeric or alphanumeric identifiers (e.g., 39292868552). Each such identifier is associated with various data and properties (including text and, in the case of pictures, image data). This data is typically stored elsewhere in the social network server farm and is accessed, when needed, by use of the unique identifier as an indexing mechanism.

Much of Alice's account data comprises graph information memorializing her relationships to different individuals, websites, and other entities. In network terminology, the individuals/entities commonly take the role of network "nodes," and the relationships between the individuals/entities (likes, friend, sister, employee, etc.) take the role of "ties" between the nodes. ("Nodes" are sometimes termed "objects," and "ties" are sometimes termed "links," "edges," "connections" or "actions.") "Liking" an item on Facebook is manifested by adding a link to the user's network graph, expressing the "like" relationship between the user and a node corresponding to the liked item. As with nodes, links are assigned unique identifiers, and are associated with various stored data and properties.

The foregoing is familiar to those skilled in social networking technology. Among such information familiar to these artisans is the Facebook Graph API reference documentation, which is published on the web, e.g., at https://developers<dot>facebook<dot>com/docs/reference/api/. (The <dot> convention is used to prevent this information from being rendered as an active hyperlink when displayed, per Patent Office guidance.)

Magazines, Etc.

Another aspect of the present technology concerns a user who encounters a photograph of interest in a magazine (e.g., National Geographic, Saveur, House Beautiful, Lucky, etc.), and wants to post it to their Pinterest account. Again, the user snaps an image of the magazine page with a smartphone, and image processing is applied to identify the image. This identification may take the form of the magazine name, date, and page number. Or the identification may provide the photographer name, and a title or identification code for the photograph in the photographer's catalog. In either event, the user is presented a web-stored version of the photograph, and can elect to post it to their social network account.

As before, the identification information allows other, related images to be identified. These other images may be related because they are printed on the same page, or in the same article, or in the same magazine. Alternatively, they may be related as other views of the same scene/item, etc., or they may depict related items. Still further, they may be related because they were photographed by the same photographer, or at the same geolocation, as the photo that originally caught the user's attention. Again, the user can elect to review and—if desired—post one or more such related images to their social network account.

Figure 3A:
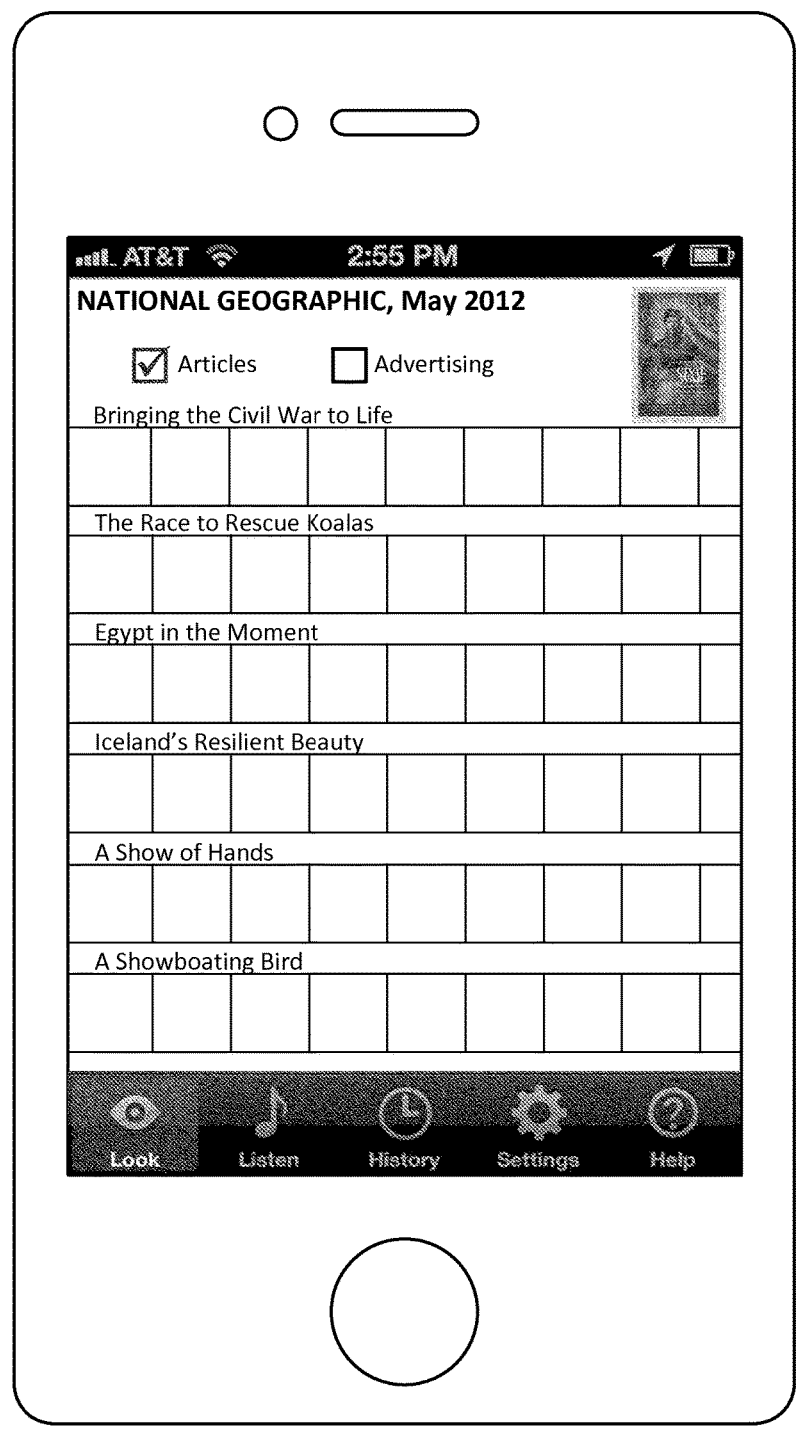
FIGS. 3A and 3B detail one form of user interface that is useful with embodiments of the present technology.
Figure 3B:
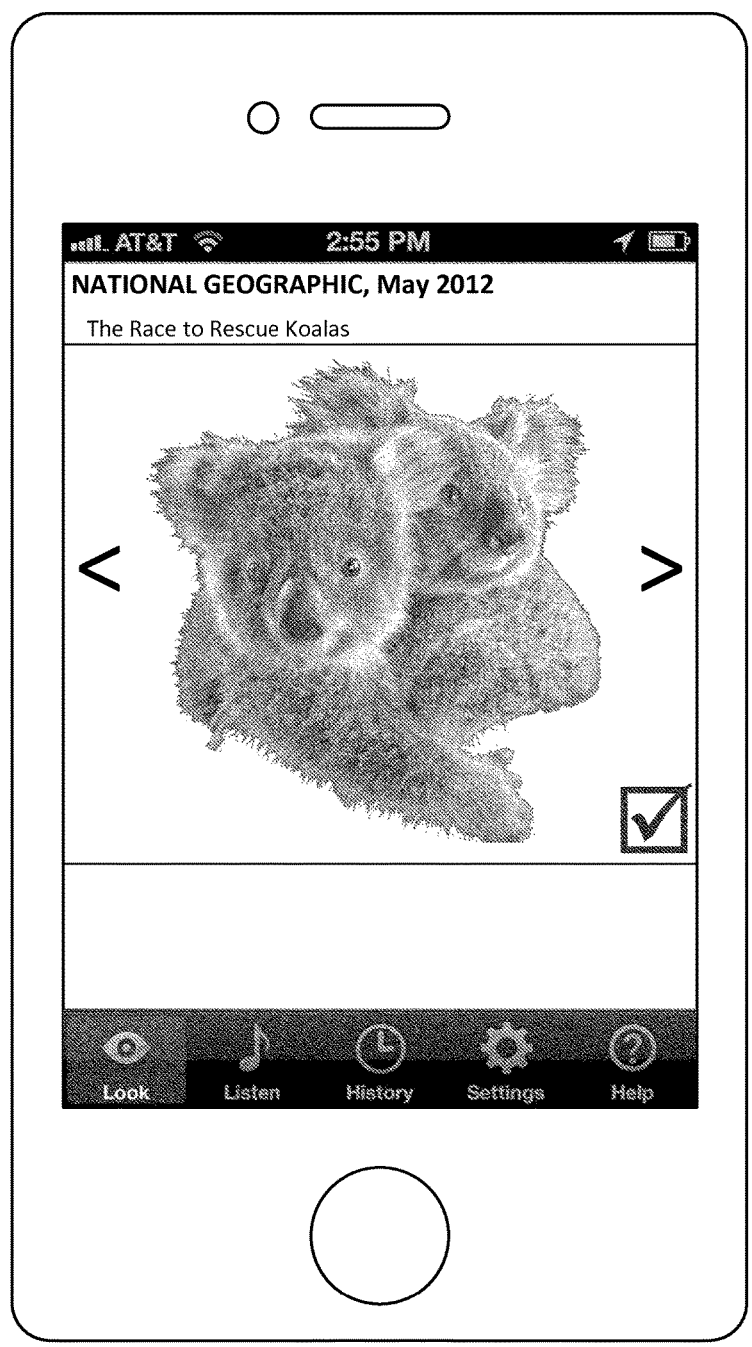

In one exemplary embodiment, a user snaps an image of a magazine cover. The particular issue of the magazine is recognized from its visual features, and the smartphone app responds with a user interface (UI) inquiring whether the user is interested in imagery from the editorial content (e.g., articles), or from the advertising. If the user responds with input signaling interest in the editorial content, the app presents a scrollable list of visual slideshows—each as a horizontal band of image thumbnails. Each slideshow corresponds to one of the articles in the magazine, and includes all the images from the article. (Such a UI is illustrated in FIG. 3A, in the context of the assignee's "Discover" app; the individual thumbnails are not particularly shown.) If the user taps in any of these horizontal bands, the slideshow expands to fill the screen (FIG. 3B), and the user can then swipe the display (or touch the arrow icons at the sides) to move forwards and backwards within the slideshow sequence. Each image frame includes a check-box that can be tapped by the user to select the image for social network posting.

If the user instead expresses interest in the advertising content, a similar UI can be used. In this case, the slideshows can be arranged by the subject matter of the advertisement (e.g., Foods, Travel, Things, Other), by page numbers (e.g., pages 1-20; pages 21-40; pages 113-130), by alphabetic sort of advertiser names, or by any other construct. (Alternatively, the display of multiple bands can be omitted, and a single, full-size, slideshow encompassing all of the advertisements in a default order can be presented instead.)

The app's preferences panel, not shown, is used to select the social networking service(s) to which selected images should be posted, and to indicate the default order—if any—by which advertisements should be presented.

The magazine publisher can facilitate such functionality. For example, the magazine publisher may provide images for an upcoming issue to a third party service provider, who embeds a hidden digital watermark in each. Each watermark conveys a plural-bit payload, which is stored in a database in association with other information. This other information can include the name and issue date of the magazine, the page on which the photograph is to appear, a publisher-authored caption for the photograph, and a link pointing to an online version of the photograph. (In some embodiments, the database can actually store image data for the photograph—either in its original size/resolution as printed in the magazine, or in other formats, e.g., as a thumbnail, or in a standardized size, such as 640 pixels in height. In other embodiments, the online version is stored in an archive maintained by the publisher.)

The digitally-watermarked photographs are electronically transmitted back to the publisher, which prints them in the magazine.

When a user's smartphone later captures an image of one of these watermarked pictures from the magazine (e.g., a picture showing a designer lamp in a lifestyle magazine), a software app on the smartphone decodes the watermark payload from the captured imagery, and transmits it to the database. (Alternatively, the decoding can be done by a remote processor, e.g., at the database system, to which the smartphone transmits image-related data.)

By reference to the received watermark payload, the database retrieves information associated with the captured image, and fashions a response to send back to the smartphone. In the exemplary arrangement, the response takes the form of an HTML5 template customized with data from the database that defines functionality of several buttons presented on the smartphone display. The buttons are user-selectable to trigger responses that correspond to the captured image.

One button, for example, may cause the smartphone browser to load an Amazon web page at which the lamp depicted in the image can be purchased. Or the app may present links to several vendors that sell the lamp—and display the lamp price at each.

A second button may launch an immersive viewer app or video app by which the user can examine imagery of the lamp from all sides. (The SpinCam app, by SpotMetrix, is one example of a suitable immersive viewer app.)

A third button may cause the system to post a pristine image of the lamp to the user's account at Pinterest. This action may invoke another UI, in the app or from Pinterest, allowing the user to specify the pinboard to which the image is to be posted, and allowing the user to type or speak a caption for the image.

In Pinterest, posting is actually effected by sending Pinterest a URL that points to a publicly-accessible version of the image, e.g., in an online version of the magazine, a public archive, or in the database system, rather than sending image data itself. In embodiments employing other social networks, the image data itself may be transferred. (This act of posting may be invoked by the smartphone, or by a remote computer—such as at the database, depending on implementation.)

A fourth button presented to the user may cause the system to present a collection (e.g., a gallery, or carousel, or slideshow) of related images on the smartphone screen. A scrollable slideshow user interface, such as described above in connection with FIGS. 3A and 3B, is one suitable arrangement by which these related images can be presented. The 3D animated "CoverFlow" (aka fliptych) interface popularized by Apple iTunes and iPod offerings, and detailed in Apple's patent publications 20080062141, 20080066016, 20080122796 and 20090002335, is another. A simple grid layout is still another. In one implementation, the user can select one or more images from the gallery for posting on Pinterest. In another implementation, the user selects one of these related images, and the system then presents a new menu of several buttons (e.g., as described herein), now relating to the just-selected image.

Other buttons presented to the user may be specific to the subject image, or may be more general. For example, a fifth button may trigger downloading of an electronic counterpart of the magazine to the smartphone's e-book reader, or may download a software app specific to the magazine or the magazine's publisher.

Of course, other response buttons can be used in other embodiments. An example is a Facebook "Like button, or counterpart response buttons for other social networks (e.g., "Follow" on Twitter). Another is a button that triggers an email of the image to user-selected recipients, or posts the image to Facebook or Instagram.

Figure 4:
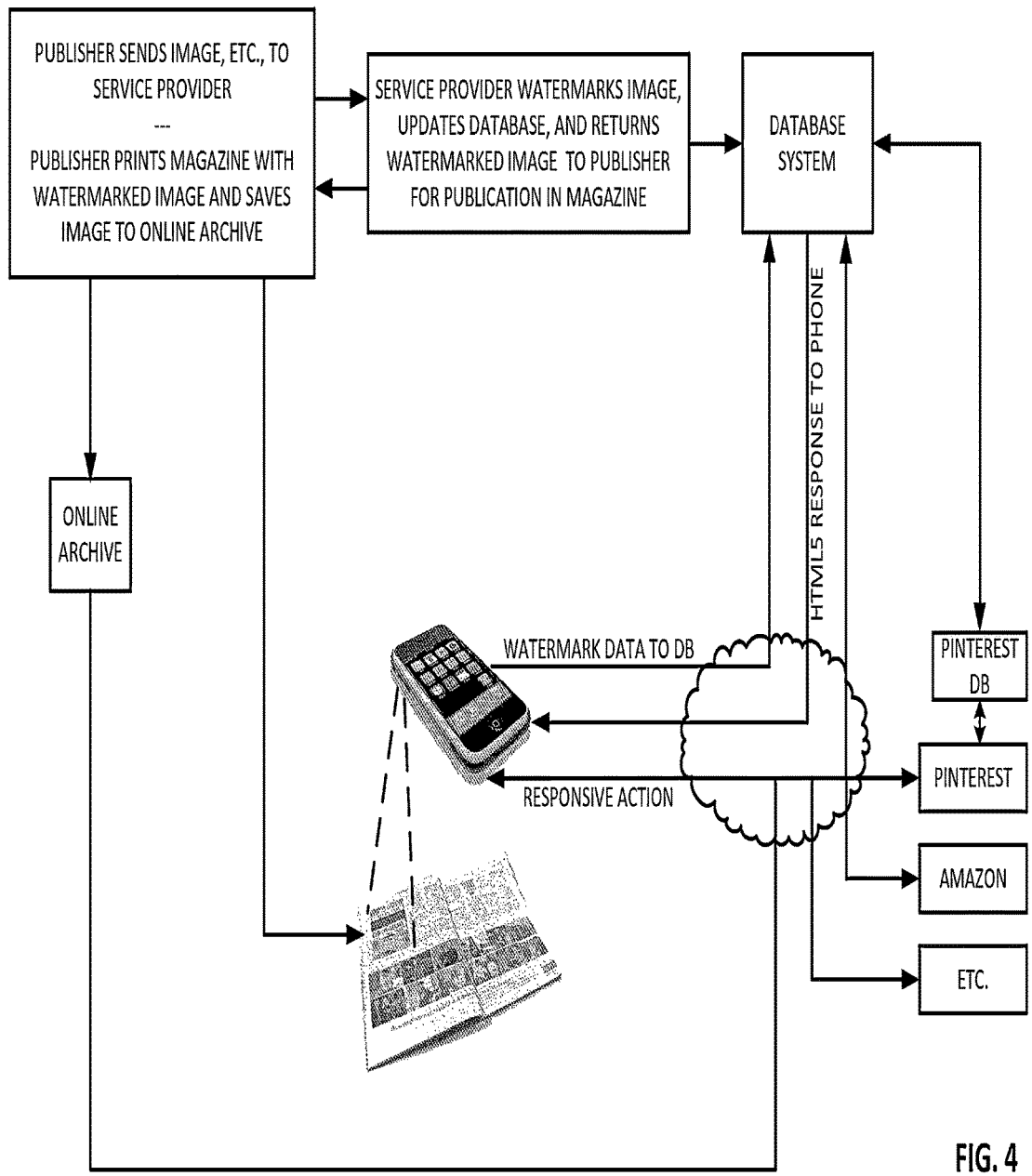
FIGS. 4 and 5 illustrate an embodiment involving print media and incorporating certain aspects of the present technology.
Figure 5:
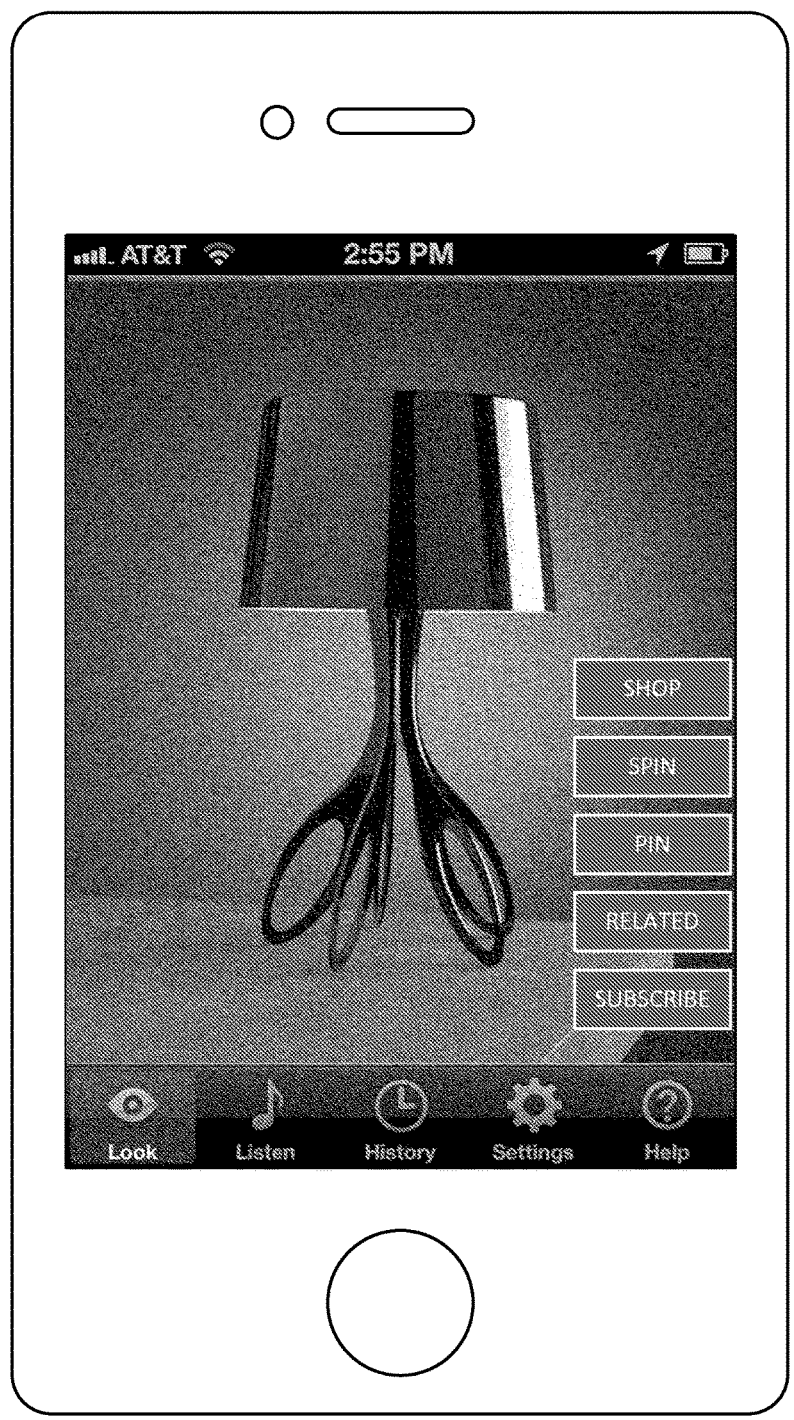

Aspects of such a system are shown in FIGS. 4-5. In FIG. 4, a smartphone reads a watermark from a magazine image, and a responsive action (determined by reference to information in the database system) is triggered. This responsive action can involve retrieving an image from an online archive for posting to Pinterest, purchasing the depicted product from Amazon, etc. It may further make use of information stored in the database system FIG. 5 shows a user's smartphone, in which an HTML5 template downloaded from the database system is overlaid on a pristine version of the magazine image captured by the smartphone (again in the context of the assignee's "Discover" app). The template is customized with data from the database to define the functionalities of the buttons.

Desirably, the different options presented to the user on the smartphone screen (e.g., by HTML5-defined buttons) are controlled by the magazine publisher. This is made possible because the information in the database is controlled by the publisher. Thus, the publisher specifies the actions with which the image is associated. This allows the publisher to control ancillary monetization opportunities triggered by the image, such as marketplaces for buying/selling products, attribution, etc.

Attribution refers to giving credit or other value to parties involved in a value chain. If an image is posted to Pinterest, attribution may involve a caption indicating the image was reproduced with permission of House Beautiful magazine, in which the image appeared in the Apr. 17, 2012, print edition. Attribution may also extend to the user who first captured the image from the print magazine, and may include a caption that this user authored. Such attribution may follow the image wherever it is re-pinned on Pinterest.

Attribution can also involve sharing in monetary or other benefits that flow from the user act in capturing the image, and the magazine's act in enabling its image to be used in such ways. For example, consider a sequence of events that may occur if Ted captures an image of a barcode on a Carlisle brand carpet rake, and choses an option from the resulting HTML5 menu that causes a pristine image of such product to be posted to his rakes pinboard at Pinterest. Other users—including Chuck—may re-pin that image from Ted's pinboard to their own pinboards (first-generation re-pinners). Each such re-pinning may include a caption noting the Carlisle brand, and acknowledging Ted as the user that started the viral spreading of this image. Ted's caption, if any, may also be presented with each re-pinned image, as part of his attribution. Still other users—including Dave— may find the image on Chuck's pinboard, and may re-pin it on their own boards (i.e., second-generation re-pinners). Again, the Carlisle and Ted attributions can appear with each such re-pinned image.

If user Ed is intrigued by the carpet rake depicted on Dave's pinboard, Ed can click on it. In response, Pinterest can take one or more actions and show various links. These links may draw from information in the original database, or from another database maintained by Pinterest (which may replicate some of the data in the original database). One link may be to purchase the rake on Amazon. Amazon has a referral program, by which parties that direct buyers to Amazon are rewarded with a referral fee. In this case, if Ed purchases the rake from Amazon through use of the image depicted on Dave's pinboard, Amazon remits a fee for Ed's referral to Pinterest, which may share it with House Beautiful, Ted, Chuck, and/or Dave.

In some implementations, the image presented on the smartphone screen following the user's capture of an image from a magazine page is only briefly the image captured by the user's smartphone. As soon as that image is identified, a pristine image of the file is transmitted to the phone, and presented to the user on the screen—replacing the originally-captured image. This image can be part of the HTML5 data provided to the phone, or can be delivered separately from the HTML5 data. If the HTML5 template includes buttons for user selection, these can be overlaid on the pristine image.

In yet other implementations, the identification data discerned from a user-captured image causes the smartphone to launch a Pinterest app (or load a Pinterest web page on the smartphone browser) displaying a pinboard on which the magazine publisher has made that image available for re-pinning.

Normally, when an image is re-pinned within the digital Pinterest realm, it stays associated with its related metadata—such as the link to its public location (e.g., a URL for the House Beautiful image archive), its attribution information, and any caption. However, if Alice prints a favorite image from Pinterest for posting on her refrigerator, and Bob sees it there and takes a picture of it with his smartphone, Bob's copy of the image is now dis-associated from its Pinterest metadata. (The same result occurs if Alice uses her smartphone to show Bob the image on a Pinterest pinboard, and Bob snaps a picture of Alice's phone showing the picture.)

Desirably, the image captured by Bob' smartphone can be re-associated with its original metadata by reference to watermark data that has been steganographically encoded into the imagery (i.e., the imagery printed for display on Alice's refrigerator, or displayed on Alice's smartphone screen). In particular, a watermark decoder in Bob's smartphone can analyze the captured imagery for the presence of watermark data. If it finds a watermark payload conveying a Pinterest image ID (e.g., an 18 digit number), it can submit this information to Pinterest to obtain the original URL for the image, together with its attribution information, and present a pristine version of the image—with caption, to Bob. A "Re-pin this image" button can also be presented, allowing Bob to re-pin the image to one of his own pinboards. Despite leaving the digital realm, the image captured by Bob's smartphone has been re-associated with its original Pinterest metadata.

The watermark embedding of a Pinterest image ID into imagery can be performed at the time a user uploads an image for posting to Pinterest. In an exemplary arrangement, a user captures an image with his smartphone, and launches the Pinterest app. The app includes an option to upload the image from the user's camera roll (a data structure in which smartphone-captured images are stored) to an image repository at Pinterest. If the user selects this option, a message is sent to Pinterest, together with associated metadata—such as the image size, the date/time, the user's geolocation information, and the user's Pinterest username. Pinterest assigns a new Pinterest image ID for the image, stores the just-provided metadata in a new database record, and downloads to the smartphone a Javascript watermark embedder that is configured to embed the assigned ID into an image having the specified size. Using this pre-configured embedder code, the Pinterest app watermarks the Pinterest image ID into the image, and uploads the watermarked version of the image to Pinterest for storage. The software then allows the user to pin the image onto one or more pinboards. Thereafter, if the image ever becomes disassociated from the Pinterest ecosystem, it can readily be restored by reference to the watermarked Pinterest image ID.

In a related arrangement, the image needn't be uploaded to storage at Pinterest. Instead, the user may upload the image to another site—such as Flickr. Yet the uploaded image is watermarked with the Javascript code to include a payload that conveys an image identifier assigned by Pinterest. If the image is ever pinned from Flickr to Pinterest, the Pinterest database already has information about its provenance.

In still another arrangement, after a user has captured an image from a print document, and a corresponding online image is located and displayed on the user's smartphone, the user taps a button that causes a link to the online image to be posted to the user's Twitter account, or to be sent by SMS service to one or more recipients designated by the user. The app can automatically include a note, "I saw this image and thought of you," or the user can author a different transmittal message. This allows users to electronically share their own print-based discoveries.

Print media may commonly have multiple watermarks within a single publication (e.g., in different articles, different photographs, etc.). If a reader uses a smartphone to capture one watermark from one photograph, the backend server that responds to this action can return response data for all of the other watermarked photos in the publication. This response data is cached in the phone and available to speed response time, if the user thereafter captures imagery from any of those other pictures.

Relatedly, certain magazines may have promotions by which they issue rewards (e.g., $5 Starbucks cards) to readers who scan a threshold number of watermarked images within a single publication (e.g., 10 images, all of the Geico advertisements, all of the watermarked images, etc.). The watermark-reading app can give feedback as it tallies the number of watermarks read (e.g., "Congratulations, you've scanned 10 watermarks. Only 5 to go!").

When smartphones are used in some environments (e.g., in-flight), network connectivity is not available. In such case, an app may cache watermark data decoded from print imagery. When network connectivity is thereafter available, the user can recall such information (e.g., from a Pending folder) and explore the associated online content.

Another way to handle offline use is for the smartphone app to locally cache, as part of the app software, payoff information that is associated with different watermark payloads.

Catalogs, Etc.

While this section focuses on catalogs, it should be recognized that the magazine-related arrangements detailed above are also generally applicable to catalogs. Similarly, the arrangements detailed in this section concerning catalogs are also generally applicable to magazines.

A catalog is commonly prepared as a computer data file (e.g., a PDF file) that includes data elements such as text, photos, and layout information. The file is provided to a printer, which prints a multipage physical document based on information the data file. The printed catalogs are then mailed to consumers.

Often, retailers who publish catalogs (e.g., Land's End) also want to publicize their products by posting information on social networking services, such as Pinterest. Such posting is presently a highly manual, labor-intensive, process.

In accordance with the present technology, this posting task is simplified. In an illustrative embodiment, the data file is provided to a computer that processes at least some of the data elements to discern several themes. The processing also includes associating certain text and photos from the data file with each of these themes. Text and photos associated with a first theme are then posted to a first online gallery (e.g., a Pinterest pinboard), and text/photos associated with a second them are likewise posted to a second online gallery.

This will be clearer with an example. Consider a Land's End catalog. Its introductory pages may feature women's wear. A next section may feature men's wear, and be followed by a kid's wear section. The catalog may conclude with pages dedicated to bedding.

In this illustrative embodiment, the computer associates each photo in the catalog with a corresponding text (a "snippet"). This can be as simple as pairing the image on a page with text on the page. (Commonly, catalogs have large images that span a full page, or a two-page spread.) In more complex arrangements, the computer can match letter-keyed text descriptions (e.g., "D. Madras Shorts . . . ") with letter-keyed legends overlaid on imagery. Additionally, or alternatively, the layout information in the data file can be examined to deduce which text is associated with which image.

In this particular example, the text on each page is semantically analyzed to produce key terms for clustering. Such analysis commonly disregards noise words (e.g., "the", "and," etc.), and focuses instead on terms that may be useful in associating the text (and images) with themes by which pinboards may be analyzed.

(Clustering encompasses a class of computer science operations by which a set of objects is divided into groups, or clusters, so that the objects in the same cluster are more similar (in some sense or another) to each other than to those in other clusters. The k-means algorithm (aka Lloyd's algorithm) is commonly used. Clustering is familiar to those skilled in the fields of data mining and statistical data analysis.)

In some embodiments, one or more snippets of text is augmented by additional terms to aid in the clustering process. For example, an algorithm can examine text snippets for the term "blouse" or "petite," and, wherever found, add the term "women." Likewise, the algorithm can search snippets for the words "pima" or "worsted" and add the terms "cotton" or "wool," respectively. Similarly, the terms "trousers" and "chinos" may trigger augmentation by the word "pants." Such equivalences can be manually defined by reference to a glossary data set, or automated arrangements for creating such knowledge bases can be employed (see, e.g., U.S. Pat. No. 7,383,169).

The themes may be prescribed by a human operator, or the themes can be organically derived by application of a clustering algorithm, e.g., applied to the key terms. (Clustering based on image features is also possible.) In some arrangements, a clustering algorithm examines the text and suggests several sets of possible themes, between which a human operator can then select. Themes such as menswear/kidswear/bedding; belts/purses/socks; and linen/cotton/wool, are examples. In some implementations, a human operator specifies the number of themes (clusters) desired, and the clustering algorithm responds by proposing one or more divisions of items that yield the requested number of themes.

Once the themes are established, the text/image pairings are analyzed to assign each to one or more of the themes. (This analysis commonly proceeds by reference to text, but alternatively or additionally can proceed by reference to image features.)

An example of a text/image pairing being assigned to plural themes would be where an image depicts both a belt and a purse, and the corresponding textual descriptions comprise a single snippet. In another example, such an image may be used in two text/image pairings: one including a text snippet describing the belt (and assigned to the belt theme) and one including a text snippet describing the purse (assigned to the purse theme).

Once text/image pairings have been associated with themes, they can be posted to the social network. In the example of Pinterest, each theme corresponds to a different pinboard. If the pinboard doesn't already exist (e.g., Belts), it is created. The pictures are posted, with the corresponding text snippets submitted as captions for the pictures to which they correspond. Again, this posting process can be performed by a programmed processor, rather than requiring involvement of a human operator.

By such an arrangement, data files for print media can be repurposed to create marketing tools for social media.

It will be recognized that such process can be performed in advance of catalog printing. Alternatively, data files for catalogs previously printed can be so-processed. If any items have been discontinued, they can be easily deleted from the pinboards.

In some embodiments, such a process is performed by a third party service provider. For example, the third party may operate a web site through which retailers can upload their catalog data files for processing. The service provider performs the process, and returns "sandbox" data showing the resulting pinboards. This "sandbox" data is not "live" to the public, but is created for the retailer's approval. Once the retailer approves, data can be sent to the social network to cause the pinboards to go live.

The third party can also—as part of its service—digitally watermark a payload of hidden information into each of the images of the received data file. This typically involves extracting the images from the file, encoding them with a watermark payload, and repackaging the data file with the encoded images. The third party, or another, can "preflight" the file to ensure that the repackaged file, when rendered into print, still behaves as expected.

The third party can also store metadata in a database that associates information with each of the embedded digital watermark payloads. The associated metadata typically includes information such as the retailer name, catalog name and date, catalog page on which the image appears, image name, text snippet associated with the image, etc. It may also include a digital copy of the image—full size and/or thumbnailed.

Returning to the processing of the catalog data file, the computer can also discern logical linkages between certain of the photos (or photo/text pairings). This logical linkage information can be used to produce presentation data that defines certain navigation paths between the images.

Consider shoes. Shoes and other accessories are commonly presented in stand-alone images, and are also sometimes presented—incidentally—in images featuring other items. Thus, a pair of shoes may be among those featured in an image containing only shoes, and the same pair of shoes may also appear in images that feature jackets and pants.

Figure 6:
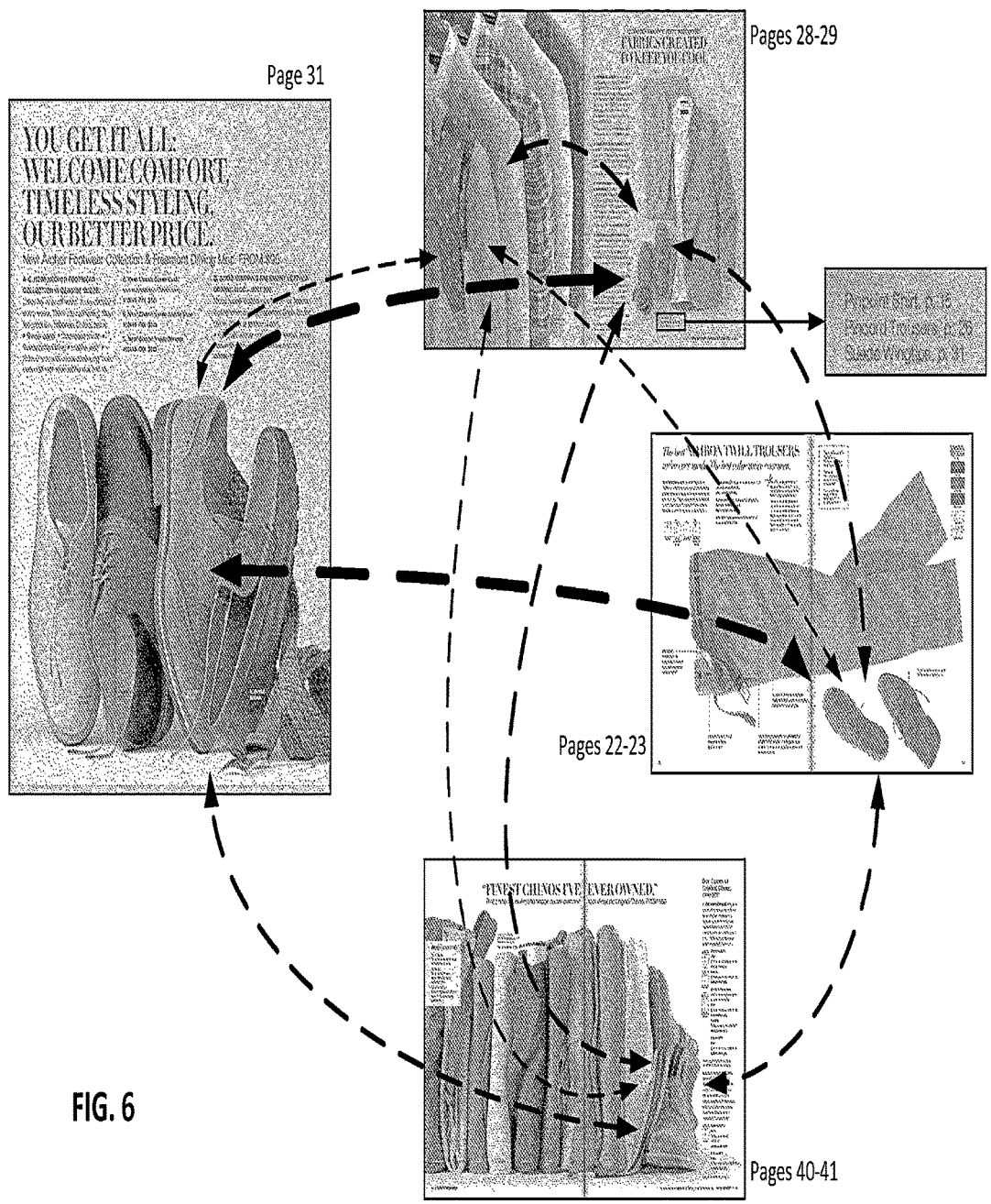
FIG. 6 illustrates aspects of linking images (and text) extracted from a catalog data file.

Such a situation is shown in FIG. 6. These four excerpts are taken from various pages of a Land's End catalog. The processor logically links these four spreads, since each depicts the same pair of suede wingtip shoes.

In FIG. 6, two spreads shown to the right (pp. 28-29 and pp. 22-23) each includes an explicit text pointer (e.g., "Suede Wingtips, p. 31," shown in the inset box) directing the reader to the page (depicted at left) where these shoes are featured. The processor discerns the logical linkage between the images on these pages by commonalty of the text "Suede wingtips" and "31" in all three places.

The same pair of shoes appears in the spread reproduced from pages 40-41. Here, however, no explicit text pointer to page 31 is found. Nonetheless, the computer can often discern—by feature matching techniques (e.g., by reference to chrominance and texture metrics, and salient point correspondence) that the shoes depicted in the spread on pages 40-41 are the same as those depicted in the other three locations.

(Note that the spread from pp. 28-29 includes two distinct images—one on page 28, and the other on page 29. However, since page 28 includes very little text, the processor infers that it should be associated with the text on page 29. The processor will also associate the shoes on page 29 with that text due to layout proximity. Based on these circumstances, the process will conclude that a logical linkage also exists between the shoes (on pages 31, 23-23 and 40-41) and the image on page 28.)

The just-noted logical linkages can have different strengths, e.g., quantified by a numeric scale ranging from 1 to 100. The strength can be a function of several variables. A linkage that is evidenced by a text pointer (e.g., "Suede Wingtips, p. 31") will be stronger than a linkage that is inferred by feature matching techniques. Linkages based on feature matching can be further scored by use of a feature matching score. As discussed in the preceding paragraph, the linkage between the shoes and page 28 is derived based on the linkage found to page 29, so the logical linkages to page 28 will be weaker than the logical linkages to page 29. In some cases, links may have different strengths in different directions. (The strengths of linkages are roughly indicated graphically by line weight in FIG. 6.)

As detailed below, these discerned logical linkages can be used, in accordance with aspects of the present technology, to establish new navigation routes between the images.

Note that when images used on catalog pages are examined in isolation, they often have large, empty regions on which text is positioned by associated layout information.

The computer processor can sense large, featureless regions (e.g., by small local variance or high frequency metrics) and crop the image to remove such areas. This is the case with catalog page 31 of FIG. 6. When this image is posted to the social networking service, a cropped version—such as is shown in FIG. 8, is desirably used.

Note, too, that the processor desirably parses and edits the catalog text snippets for posting on the social network. For example, pricing references may be semantically detected (e.g., clauses including a "$" symbol or the word "price") and then removed. Likewise with sizing references. Similarly, where the catalog text includes redundancies, the redundancies can be abridged. Where, as in the page 31 example, the image depicts four shoe styles, the processor may edit the accompanying text to produce four snippets—one associated with each shoe style (deleting descriptions of the three other styles), and then post four identical pictures to the social network—each with a different caption (corresponding to the different styles).

Figure 7A:
FIG. 7A shows original text from a catalog.
Figure 7B:
FIG. 7B shows such text after processing.

This is illustrated by FIGS. 7A and 7B. FIG. 7A shows an image of the original text as rendered for printing in the catalog. FIG. 7B shows the text after processing, for use with the suede wingtips. The processor has deleted "OUR BETTER PRICE" in the headline, and "FROM $90" in the subheading. The redundant phrase "NEW! ARCHER FOOTWEAR COLLECTION" at the lead-in to the descriptive paragraph in the left column has been omitted (punctuation distinctions, such as "!" are ignored), as has the sizing information at the bottom of this column. The "A" and "B" subparagraphs in the second column, specific to the other shoe styles, have been deleted, as has the catalog number and price of the classic suede wingtips. Finally, the third column of text—concerning the leather driving mocs has been omitted.

Figure 8:
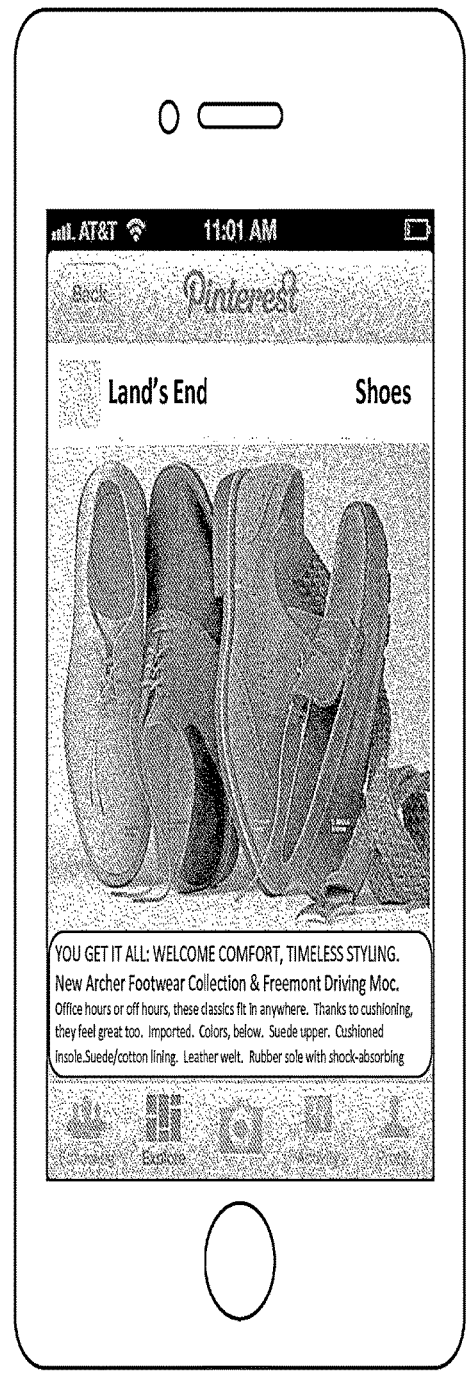
FIGS. 8-10 illustrate aspects of the technology concerning catalog content repurposed for social network use.

FIG. 8 shows the cropped picture, together with the edited text, in the context of the Pinterest app (showing "Land's End" as the username, and "Shoes" as the pinboard name).

As is familiar to users, the Pinterest UI shown in FIG. 8 presents the picture sized so as to fill the width of the screen. If part of the picture is too large to fit in this presentation, the user can make a finger-swipe-up gesture to scroll-up, revealing the lower part of the image. The finger-swipe-up gesture also reveals any part of the caption that doesn't fit in the original placement. (E.g., in FIG. 8, part of the caption is off the screen, to the bottom.)

Finger-swiping from side to side does nothing. If the user wishes to review other pictures on the "Shoes" pinboard, the "Back" button in the upper left of FIG. 8 is touched, which presents thumbnails from the "Shoes" pinboard in three column fashion, which can again be scrolled-up and -down by vertical finger swipes, for use of a next-desired image. (Again, a sideways swipe does nothing.)

In accordance with another aspect of the present technology, other navigation actions can be taken—based on the linkages earlier discussed. One such arrangement is shown in FIG. 9.

Figure 9:
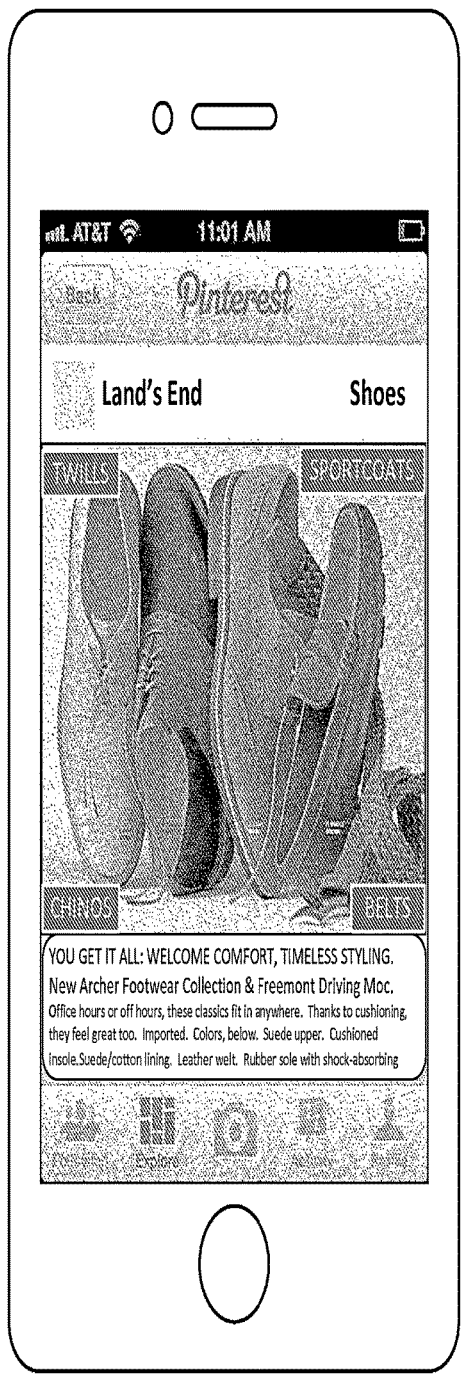

FIG. 9 shows several linking buttons overlaid on the screen. These are summoned by user command, which can naturally vary by implementation. For example, a double-tap on the picture can cause these buttons to appear. Alternatively, the menu of options that appears responsive to a single picture touch (which menu presently includes, e.g., "Share on Facebook," "Save to Camera Roll, etc.), can be augmented to include a "Show Links" button.

Touching any of these links causes the app to present the image (or pinboard) corresponding to the displayed keyword (e.g., Twills). If there are several images (or pinboards) associated with the keyword, the app navigates to the one with the highest linkage strength (as discussed above).

Referring back to FIG. 6, it will be recognized that "Twills" button in FIG. 9 will link to the "No Iron Twill Trousers" image (and caption) based on catalog pages 22-23. Similarly, the "Chinos" button will link to the "Finest Chinos I've Ever Owned" spread based on catalog pages 40-41. In like fashion, the "Sportcoats" button links to the spread based on pages 28-29.

For clarity of illustration, FIG. 6 does not show a link based on belts. However, it will be recognized that the lower right corner of catalog page 31 depicts a belt. This belt is recognized by the processor to correspond to a two-page spread of belts on pages 42-43. Thus, touching the "Belts" button of FIG. 9 will link to this further spread.

The four buttons shown in FIG. 9, and their placements, are exemplary. There can naturally be more or less buttons, and their presentation by the UI can vary. The depicted buttons are labeled with the names of products (e.g., Twills, Chinos) rather than the class of products (e.g., Pants), but in other embodiments, class-based labels can naturally be used. If there are more than four links from the image, three link buttons can be presented for the strongest links, together with a "More" button. If touched, the "More" button presents menu buttons for a next-strongest group of links.

In some implementations, there is a button for "Shoes"—navigating to another shoe image/caption that has the greatest link strength to the image/caption of FIG. 9. (In the illustrated example—in which the image from catalog page 31 is posted four times—each time with a caption corresponding to a different one of the depicted shoes, the image with the greatest link-strength will naturally be one of those other three postings.)

In still other embodiments, arrangements other than menu buttons can be provided for navigation. For example, finger sweep gestures to the left and right can cause different modes of navigation. A finger-sweep gesture to the right can lead to the photo with the greatest link-strength to the base (original) photo, and a finger-sweep gesture to the left can lead to a photo that follows the base photo in the printed catalog. (If there has already been a sweep to the right or left, a sweep in the opposite direction simply backtracks. To switch navigation modes, the user first double-taps the image.)

A variety of such different navigation modes can be implemented, with different swipes leading to navigation in different dimensions of information (e.g., by color direction, by shoe style, etc.).

It will be recognized that some of these navigation acts can lead to photos posted on pinboards different than the base photo. (E.g., the suede wingtip shoes may be posted on a Land's End "Shoes" pinboard, while the belts may be posted on a Land's End "Accessories" pinboard.

Figure 10:
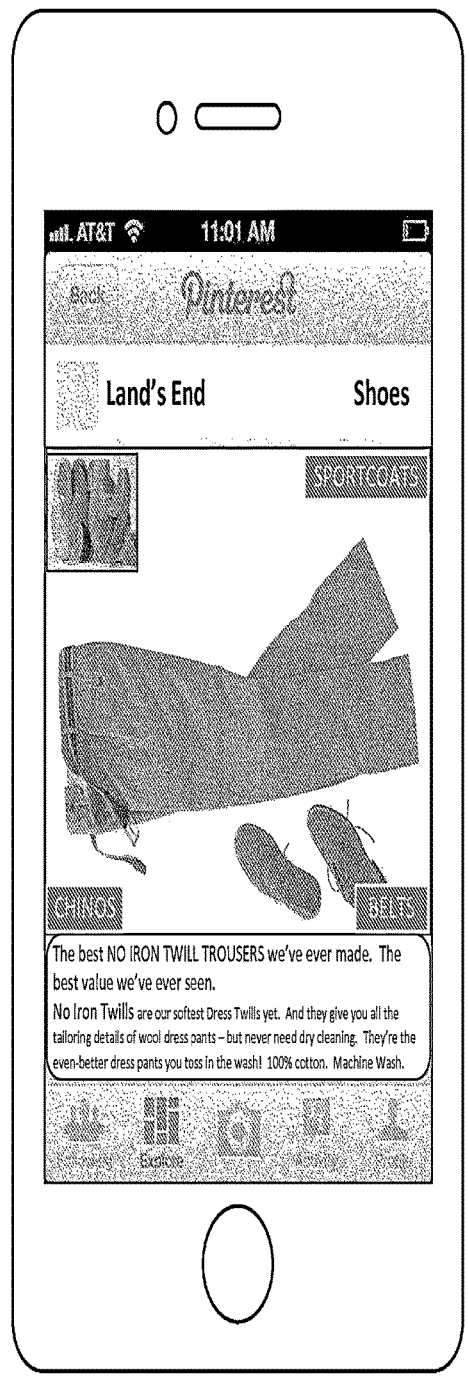

FIG. 10 shows the smartphone UI after the user has touched the "Twills" button of FIG. 9. The "Twills" image from catalog pages 22-23 is displayed, together with the accompanying text caption. The overlaid buttons remain the same—except the "Twills" button by which the user navigated from FIG. 9 to FIG. 10 has been replaced by a thumbnail of the shoes image of FIG. 9. Thus, the user can still explore all the links associated with the FIG. 9 "shoes" image, even though the image depicting twill trousers is now displayed. The thumbnail reminds to serve the user of the base image to which the displayed menu buttons relate.

The user can return to the full-size "shoes" image by touching the thumbnail in the upper left.

If the twill trousers now capture the use's interest, the user can summon link buttons related to the trousers by double-tapping the FIG. 10 image, or by touching the image once and selecting an option from a menu—as discussed earlier.

Figure 11:
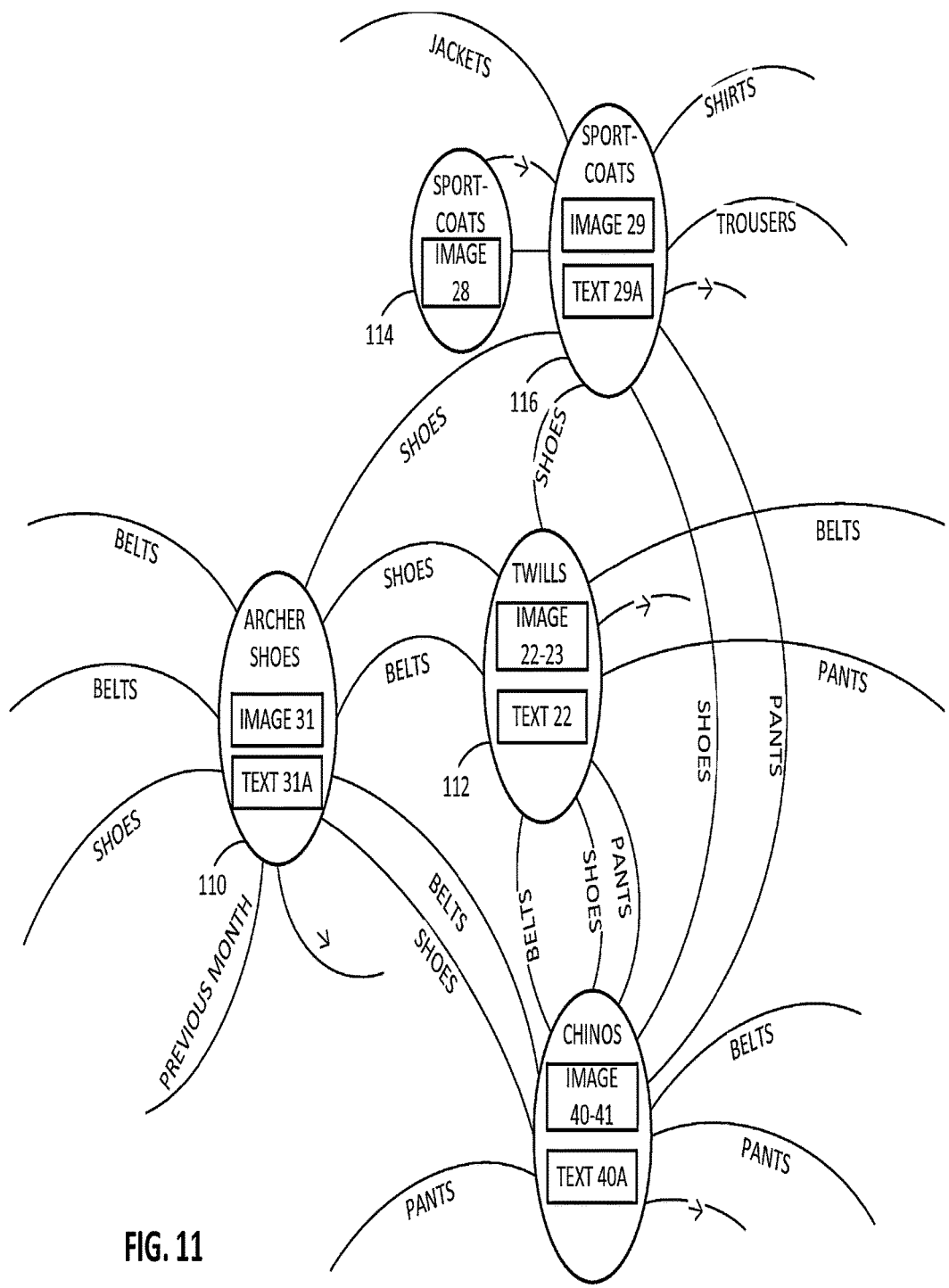
FIG. 11 shows an incomplete excerpt of an object network.

The image/caption pairings, and the relationships between them, comprise a network of objects. FIG. 11 shows a partial view of the network.

In accordance with another aspect of the present technology, network constructs used with social networks are here utilized with the present object network. For example, as shown in FIG. 11, the network comprises nodes and links. The nodes typically comprise one or more images and/or text snippets. Each node is named with a descriptive name—typically taken from the text on the page. Thus, on the left of FIG. 11 is a node 110 entitled "Archer Shoes." This node includes an image (here denoted by reference to its page number, e.g., "Image 31") and a text snippet. The text snippet of node 110 is denoted by "Text 31A"—indicating that it is the first text snippet corresponding to catalog page 31 (of, in this case, four text snippets).

Node 110 relates to several other nodes through various links. Each link is generally named with a relationship class (e.g., "Shoes"), and also includes a strength (not shown in FIG. 11). While only a few nodes are shown, these few nodes link to a much greater number of not-shown nodes—as indicated by the unterminated links.

It will be recognized that certain implementations of the technology deduce, from the structure of a catalog, a corresponding network topology. That is, the relationships expressed and implied by the catalog are mined to determine how the information can be logically expressed in a social network experience. An object graph is synthesized from the catalog to establish a network of things.

In addition to topical links (e.g., "Shoes" and "Pants"), the network can include other links. For example, the links in FIG. 11 that are annotated with arrows point to the next page in the as-printed-in-catalog order. (It will be recognized that each such link can be traversed in the opposite direction to identify the prior page in the catalog.) The links with no annotation (e.g., extending between notes 114 and 116), are not topically limited, but instead indicate that the two objects may be regarded as a unitary object—with topical commonality.

The object network of FIG. 11 is implemented, in an illustrative implementation, as information in a computer-maintained data structure. The data structure may store identifiers corresponding to the various image names, text snippet names, node names, and link names (or this information may be stored directly in the data structure).

Figures 12, 13:
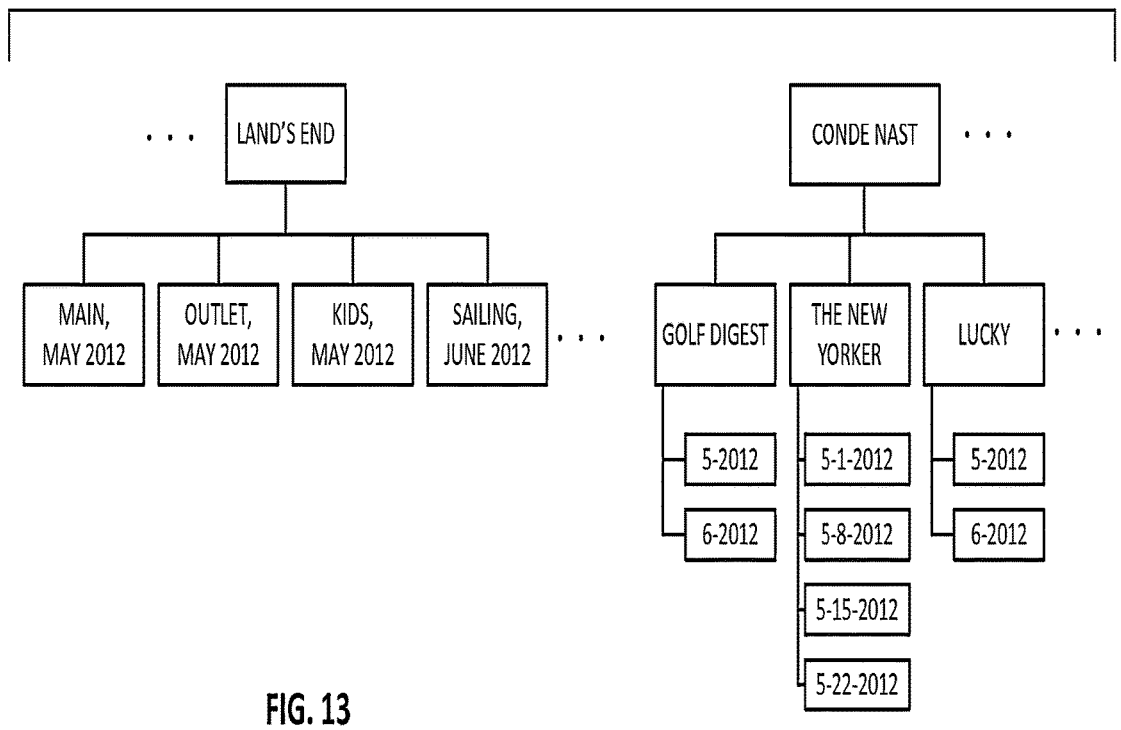
FIG. 12 shows an excerpt of a data structure relating to the network of FIG. 11.
FIG. 13 shows a hierarchical arrangement of which the FIG. 11 object network is a component.

FIG. 12 shows one such arrangement, employing a table as the data structure, with each record (row) in the table corresponding to a node or link. Node 110 of FIG. 11 is represented by the number F0001, and node 112 is represented by the number F0002. Records for these two nodes each includes the text name of the node, and a file name reference to its data elements (here an image and a text snippet).

FIG. 12 also shows entries in the data structure for two of the links (i.e., the "Belts" and "Shoes" links between nodes 110 and 112). The former is represented by the number A0644, and specifies the class of the link ("Belts"), the link strength (12), and the two nodes linked by the Belts relationship (i.e., F0031 and F0022). Similarly for the latter, "Shoes," link (represented by the identifier A0823). FIG. 12 also shows a data structure entry for a "next page" link between node 110 and the following page in the catalog.

(It will be recognized that this simple data structure facilitates understanding of the technology, but a more complex data structure may be used in actual practice, e.g., a relational database including various additional data elements—such as further object properties.)

The data structure of FIG. 12 is labeled "Land's End, Main, May 2012"—indicating its entries correspond to nodes and links found in the May issue of Land's End's primary catalog. In an illustrative implementation, there are other data structures (e.g., tables) for other publications.

Consider FIG. 13, which illustrates a small excerpt of the universe of print media, in hierarchical fashion. Land's End is one publisher, and it issues a variety of catalogs (e.g., "Outlet," "Kids," etc.). Magazine and newspaper publishers also issue a great variety of publications; a few of those from the Conde Nast family of publications are illustrated.

Links can extend between publications. For example, a Land's End advertisement for boating moccasins in the May 8, 2012, issue of The New Yorker magazine may be linked to a page in the Land's End June, 2012, "Sailing" catalog. Similarly, a bedspread in the main Land's End catalog may be linked to a photograph in an article in Lucky magazine where that bedspread is pictured. Links to other publications can be specified by data in the data structure, such as prepending "Conde Nast/The New Yorker/5-8-2012/" to a topical link class "Shoes" in the FIG. 12 table.

(If a different table is used to define the object network for each publication, then it may be convenient to memorialize links between objects in different publications twice—once in the table for each publication. E.g., a link can be expressed by a record in the New Yorker, 5-18-2012, table pointing to an object in the main Land's End catalog, and a similar link can be expressed by a record in the main Land's End catalog table pointing to the New Yorker table. In other embodiments, object subnetworks for each publication within a publisher's family are stored in a single data structure for that publisher, or the subnetworks for each publisher are stored in a global data structure encompassing all publishers and their publications. Where links are between two objects stored within the same data structure, then a single link record will commonly suffice.)

Logical links between disparate publications are more difficult to discern than links within a single publication. However, extension of the same techniques can be used. These include text matching, image feature matching, explicit references, etc. Google is understood to scan most magazines (and many other print media) to extract corresponding digital data from the print media. The data it collects can be processed to discern object links extending between different publications and publishers.

Like magazines, catalogs are commonly issued on a periodic basis. Although not depicted in FIG. 13, many of the Lands' End catalogs are issued monthly, or every-other month. Desirably, an object in one catalog that corresponds to the same object in a subsequent catalog is related by a link in the Land's End network. (This is shown graphically in FIG. 11 by the "Previous Month" link extending from object 110, and by the last record in the table excerpt of FIG. 12.)

Consider what happens if a link is discerned between an advertisement for suede wingtip shoes in the May 1 issue of The New Yorker, and a corresponding entry in the May 2012 main Land's End catalog. Then consider that the May catalog is superseded by a June catalog. In this case, the link between the suede wingtip image/text in the May and June catalogs can be traversed by a processor that processes data in the network for a user, to identify the June catalog entry as being most relevant to that advertisement in the New Yorker (because it is more recent), even though the June issue had not been published at the time the May 1 issue of The New Yorker was processed to discern links.

While the foregoing discussion focused on authoring Pinterest-like collections of imagery, and navigating among the images, it will be recognized that a user can enter this digital experience by capturing an image from a print catalog or magazine (from which image a digital watermark is extracted or fingerprint data is computed), as described earlier. The publisher of such media can arrange for the watermarking of the images at pre-press time, or can calculate fingerprint data by which the images can be recognized at any time, and store such data (at Pinterest or elsewhere) to enable consumers to enter the digital experience from the print world.

Text URL- and QR Code-Transcoding

Many magazines and catalogs commonly include text URLs, such as "For more information, visit www<dot>magazine<dot>com/my-big-story." Others publish blocky QR codes by which readers can link to associated information.

The above-described software tool that takes a PDF publication file, and performs various processing on it, can also examine the PDF contents for QR codes and for text including URLs (e.g., looking for "www,"<dot>com, <dot>org, etc.). Whenever such indicia is found, the software can apply a watermark to that page (or to that portion of the page). The watermark includes a payload that is associated, by a backend database, with the URL represented by the text or barcode. (Watermarking of printed text can be performed in various ways, such as by applying a light yellow watermark pattern—imperceptible to humans, but machine-readable.) When a user thereafter captures an image of the page with a smartphone, a watermark detector extracts the encoded payload, and links to the corresponding online destination. (Some versions of this tool may augment the existing text of the PDF document to include words like "Scan the article text with your smartphone camera to learn more.")

Social Network-Based Authoring

In accordance with yet another inventive aspect of the present technology, the contents and/or layout of a publication are determined, at least in part, by reference to information derived from one or more social media networks.

Consider Land's End as it prepares its June catalog. The company has collected sales data for items in its May catalog, so it knows which products sell best. However, it knows relatively little about the customers who purchased different products.

Meanwhile, imagery from the May issue has been repurposed by consumers on Pinterest and other social networks. (Land's End may find that many more people repurpose imagery from the May catalog than actually order products, so the social network use of the catalog can provide a richer source of information than May catalog sales data itself.)

Some of the social network postings (e.g., on Facebook) allow the company to discern age, geography, and other demographic data about the people who posted catalog imagery. Other postings (e.g., on Facebook and Pinterest) allow the company to discern product pairing relationships between items that were not immediately apparent.

For example, social network analysis may reveal that a knit top with a conservative pattern—which Land's End had targeted for consumers in the 45-55 year age bracket, seems most popular with the 18-25 year old crowd. For its June catalog, Land's End decides to update the photograph of that product to show it being worn by a younger model.

(To explore this issue further, Land's End may decide to run two pictures featuring the knit top in the June issue—one with a younger model and one with an older model. After the catalog has been published, the company can analyze the social network repostings of the two different images to gain further data. This analysis can be normalized to take into account the known age distributions of Pinterest users.)

The company may also find that consumers who post imagery of the knit top from the May catalog to their Pinterest boards frequently (i.e., more often than random chance would indicate) also post imagery of a particular pair of canvas slip-on shoes. The association between the knit top and those shoes had not been apparent to Land's End previously, but for the June catalog they decide to follow the implicitly expressed preference of its social network fans: they decide to picture these shoes on the same page as the knit top. (Alternatively, the company may decide to have the photo spread featuring those shoes moved up in the catalog page order, to immediately follow the page featuring the knit top.)

Although Land's End can survey social networks for information useful in refining its catalogs, this process may be more efficiently performed by a service provider—such as Axciom—who performs such analyses for a variety of mail order businesses. For each item in a catalog (e.g., which may be uploaded by the retailer to a computer at the service provider), the service provider can report on the distribution of interested consumers based on their demographic profiles. Indeed, the service provider may be able to match social network profiles with individual consumers—allowing other consumer-related data in the service-provider's database to be used in the analysis, and reflected in the report back to Land's End.

The service provider can also report on the co-occurrence of each item of catalog merchandise with other items of merchandise—both within the same user's social network account, and within a particular pinboard in that user's account. Moreover, the service provider may report on any statistically significant co-occurrences (i.e., greater than would be expected by random chance) between postings of particular items of Land's End merchandise and postings of items from third party vendors. For example, if such analysis shows that a Land's End knit top occurs on Pinterest boards to which photos of seersucker shorts from Eddie Bauer are also posted, Land's End may decide to offer a similar pair of seersucker shorts on the same page as the knit top in its next catalog.

By such techniques, the content and/or layout of catalogs is adapted in accordance with information gleaned from consumers by their use of catalog imagery of social networks.

(While described in the context of catalogs, the same principles can be used in the publishing of books and magazines, in the presentation of online merchandise offerings and other information, and in the creation of movies and other entertainment, to tailor the authoring of such content based on social network-based data.)

History-Based Social Network Posting

In accordance with a further inventive aspect of the present technology, a historical log of activity is used in connection with social networks.

Most users who pin new pictures to their Pinterest pinboards (as opposed to re-pinning photos found elsewhere on Pinterest) do so while browsing, by tapping a "Pin" button on a Pinterest toolbar presented by web browser software on their computing device (e.g., Internet Explorer 9).

Sometimes, however, people are in a hurry when they browse the web, and they do not activate the "Pin" button when a desired photo is on the screen. Also, people who join Pinterest need to start from scratch in locating favorite photos—no provision is made for photos encountered before joining the social network.

In accordance with a further aspect of the technology, a software application accesses the "History" file/cache maintained by browsers. The software recalls images from this data store (or re-fetches them, if the data store contains only links) and presents the images on the user device screen in a gallery presentation. In some embodiments, a Pinterest-like pinboard presentation is used. The user scrolls through the screens of pictures and simply taps or clicks on the photos of interest. The software responds by posting these user-selected photos to the user's social network (e.g., Pinterest) account.

The software can filter the history by date, so that the user can review just images from web pages visited, e.g., during the past month, or during June, 2011, or during some other bounded time interval.

In one particular embodiment, the software uploads the first 50 or 100 images within the bounded time interval to the user's Pinterest account. The user thereafter uses Pinterest's editing facilities to delete photos that are not desired (and optionally to move the retained photos to different pinboards). This process can be repeated—automatically in some implementations—for subsequent groupings of 50 or 100 images.

In embodiments of such technology, the software may disregard images smaller than a certain size, such as comprising less than 10,000 or 20,000 pixels. By this arrangement the user needn't bother with icons and other small-format image components of web pages, which are unlikely to be of interest.

While detailed in the context of web browsers, it will be recognized that the same principles can likewise be applied to any history data—regardless of its source. For example, when a user uses a camera phone to capture an image with the Google Goggles app, and submit it for processing, a copy of the image is stored. Such an archive of images previously captured by the smartphone camera can be reviewed, and selected photos can be posted to Pinterest.

Templates

A still further inventive aspect of the present technology involves use of templates with social networks.

In an exemplary embodiment, software on a user device recalls from memory (or receives from another source) a template data file. This template data file defines multiple template regions in which different photos can be placed. The user selects particular photos for use within regions of the template, and identifies the placement of each. The result is a composite image, which can be posted to a social network.

Figure 14:
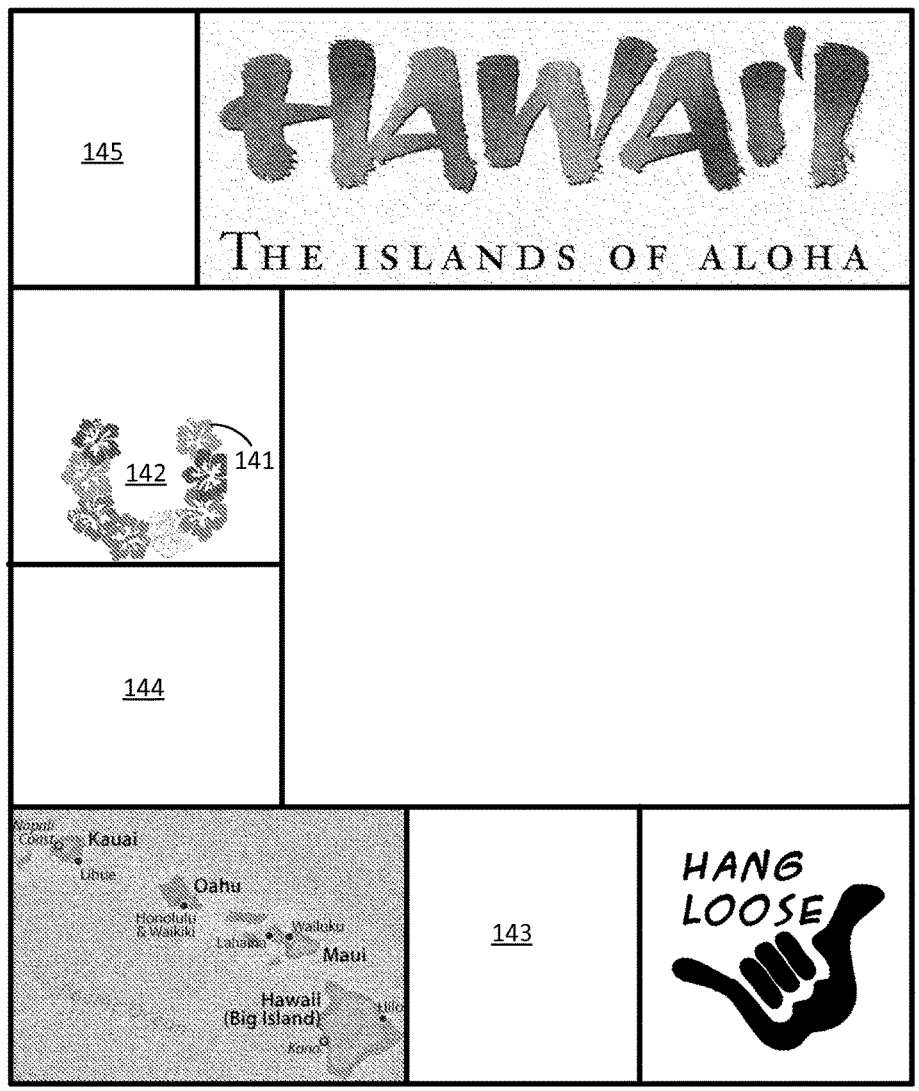
FIGS. 14 and 14A show an illustrative template, and a photo with a template feature overlaid.

An illustrative template is shown in FIG. 14. This template is tailored to aid in creating a pleasing presentation of Hawaiian vacation photos. Some regions of the template are pre-filled with artwork or text. Other regions are available for placement of images selected by a user from a collection of vacation photos. (The collection may be stored on a user device, such as a camera or thumbdrive, or it may be resident in a remote data store, such as the Flickr photo service.)

Figure 14A:

In some templates, pre-filled elements (e.g., the lei in FIG. 14) can be user-sized and positioned to overlay a photo in a desired manner—masking part of it. Thus, when a user places a photograph of a person in region 142, the lei can be made to appear to be around the person's neck—as shown in FIG. 14A.

Figure 15A:
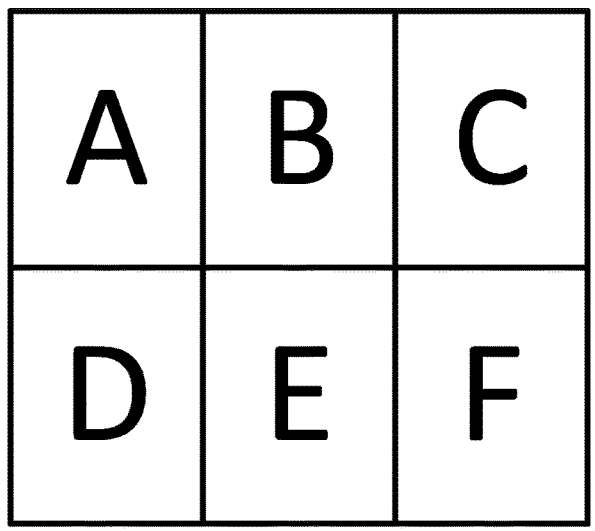
FIGS. 15A-C, and 16A-C, illustrate certain template-related operations.
Figure 15B:
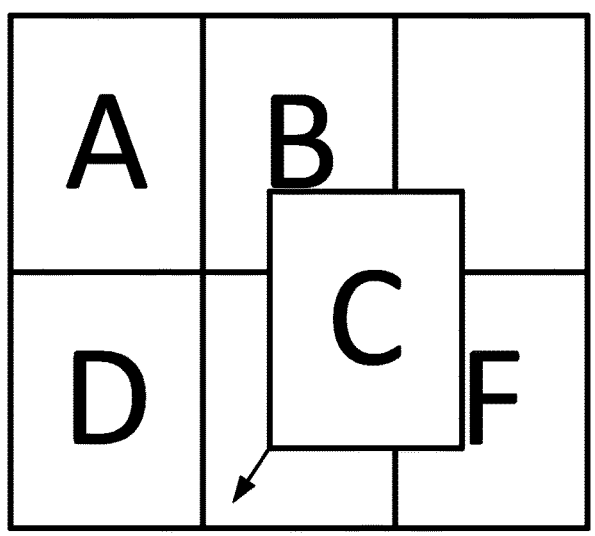
Figure 15C:
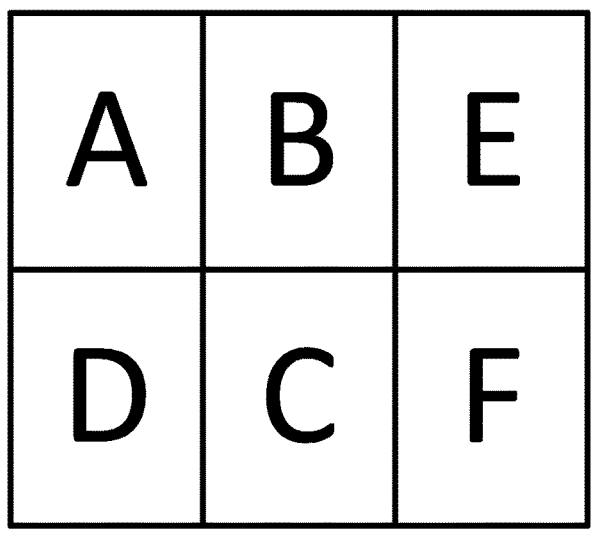

Drag-and-drop user interface techniques can be employed to aid the user in arranging photos within a template in a desired manner. Aspects of such a user interface are shown in FIGS. 15A-15C. A template with six regions is shown, populated with six images: A-F. The user can click (or touch) and drag photo C to the position occupied by photo E. When photo C is released, the user interface automatically snaps photo C to the region formerly occupied by photo E, and moves photo E to the position formerly occupied by photo C.

Sometimes the photos being moved, or their respective regions, have different sizes and/or aspect ratios. The software desirably resizes photos automatically to fill regions of the template in which they are placed. However, aspect ratios can be handled differently.

Figure 16A:
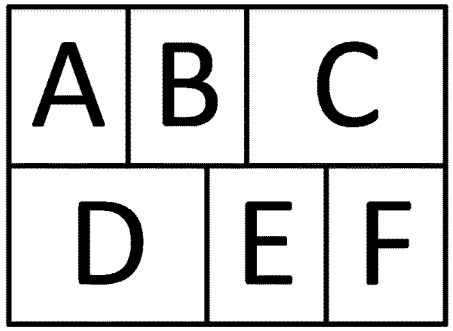
Figure 16B:
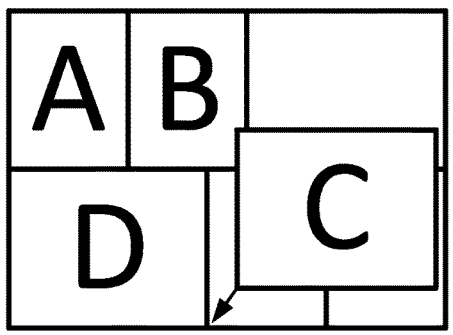
Figure 16C:
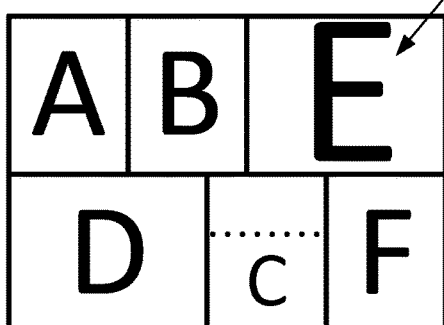

FIGS. 16A-16C illustrate this aspect of the technology. Again, the user drags photo C to the region occupied by photo E. In this case, however, the regions and their new photos have different aspect ratios. In this case, pop-up menus are presented—asking whether the user wishes to crop the edges of the photo to conform to the aspect ratio of the template region, or whether the user wishes to maintain the photo's original aspect ratio.

In the former case, the software removes pixels from the top/bottom (or sides) of the image to fit the region's aspect ratio. This is shown by reformatting of the photo E in FIG. 16C. (In some implementations the user can adjust the position of the photo within the region to determine what part of the image is trimmed.)

In the latter case, where the user chooses to maintain the photo's aspect ratio, the image is re-scaled so that it fits within the region. In such case, a blank or fixed-color region adjoins one or two sides of the image. This is shown by reformatting of the photo C in FIG. 16C. (Again, some implementations allow the user to adjust the position of the photo within the region, which may result in different-width solid borders added to two opposing sides of the image. In FIG. 16C, for example, the user has dragged the image to the bottom of its new region, so a black border appears only at the top of this image.)

In still other embodiments, the template is malleable. The user can tap to select a border between regions of the template, and then drag it to adjust the template. This makes one or more of the template areas larger, and makes one or more other areas smaller.

While templates are usually filed with photos selected by the user, in accordance with a further feature of the technology, this needn't be the case. Instead, a template may be prescriptive. It may have a preference for what types of images are placed in which regions. Software associated with the template can automatically analyze a collection of images specified by a user (e.g., within a computer directory containing Hawaiian vacation photos), and populate the template with photos matching certain rules.

For example, a prescriptive template may specify that region 143 of the FIG. 14 template should be filled with a photo of a flower. The template rules may further specify that region 144 should be occupied with a shot that includes a sunset, and region 145 should be filled with a photo of a seashell.

The software then conducts image analysis of the specified directory of images to identify candidate images of each type. Known techniques for determining image content are applied. (E.g., sunset is typically characterized by a generally horizontal horizon, with orangish hues in the top part of the image, and with less luminosity along the bottom of the image, etc.) If several qualifying images are identified, the software applies quality metrics (e.g., contrast, color saturation, and/or rules based on artistic composition, etc.) to make a selection. The software may "stack" alternative images in a region, and the user can review them in sequence by tapping (or clicking) on a region. Each photo appears in turn, with the software's top choices appearing first. In some implementations the software has the ability to automatically crop photos to zoom-in on a desired element—such as a flower or a seashell, and the thus-processed photo can be inserted in a particular region.

Typically, the user has the ability to alter the choices made by the software, but the computer-filled template is often a good starting point from which the user can then edit.

In some embodiments, the software embeds a digital watermark in each of the component images placed in the template. When decoded by reader software, the watermark triggers an action—often user-specified—corresponding to that photo. In other embodiments, the composite image is encoded with a single watermark—spanning all the photos. Again, this watermark can be sensed and used to trigger an associated digital behavior can be launched.

While a template is often filled by an individual, the effort can also be collaborative. Two or more people can cooperate, online (e.g., using their smartphones), to create a composite image using a template. A computer accessible to both people can host the template, and it can respond to their respective instructions. The computer can provide turns to each participant, in a manner familiar from collaborative app games, such as "Words with Friends" and "Draw Something." In another arrangement, the template is transmitted between the users—each taking turns at editing the joint effort. A variety of other collaborative techniques can also be employed.

Some templates may allow a user to insert a video in certain regions—activated when the user taps or clicks in that region. (An indicia can be presented in the corner of the region indicating that the displayed image is a still frame from a video.)

After the template has been filled, and the composite work has been found satisfactory by user-previewing, the template authoring software (or other software) can post the resulting composite work to a social networking service, such as Pinterest. Such an image collection may also be designated private, and sent (or a link sent) to particular recipients identified by the pinboard author.

Desirably, when an image is added to a composite work (e.g., a template), it is digitally watermarked with information that enables a later viewer to link back to the original source of that component image, or to link to associated content. When the composite work is thereafter shared on social media, individuals can click on the separate images and be directed to the original image, or to the original unique payoffs (e.g., websites, videos, etc.) associated with those photos.

Geographically-Based Posting

In accordance with still another inventive aspect of the present technology, software is provided that enables a user to obtain imagery from a particular geography, and post from such software to social networking services.

In one particular implementation, the software invites the user to specify a geography of interest, such as by name (Statue of Liberty), address (1600 Pennsylvania Ave., Washington D.C.), latitude/longitude, etc. Alternatively, the software can present a user-navigable map (e.g., such as is provided by Google Maps and Bing Maps). In such arrangements, the user clicks on a desired region, and further navigates by gestures and on-screen controls to locate an intended geography. (In the case of a map, the intended geography can span the area displayed on-screen—allowing the user to focus or broaden the inquiry by zooming-in or—out.)

Once the desired geography is established, one or more online repositories of images is searched based on geolocation. As is familiar, this can be done in various ways—such as by text metadata (Statue of Liberty), zip code, latitude/longitude, etc. The software then downloads—for presentation to the user—imagery from the specified locale. (The software may screen the imagery to delete substantial duplicates, and present imagery only of a certain quality, e.g., color imagery having more than 10,000 or 20,000 pixels.)

The images are presented to the user with a UI that facilitates posting to a social network site. For example, the software can provide a "Post to Facebook" or "Pin on Pinterest" control that can be activated, e.g., by tapping desired photographs, checking check-boxes for desired photographs, etc.

Once the user has selected imagery of interest, the software posts the imagery to the desired social networking service.

These principles likewise apply to web sites with geographic associations. The user may specify a location (e.g., NE Alberta St, Portland, Oreg.), to which the software responds with a Google/Bing map of the neighborhood. Annotated on the map are attractions, such as restaurants, etc. If the user clicks (taps) on one of the attractions, the software opens a corresponding website. Alternatively, the software can conduct a search for websites—corresponding to the selected geography, and optionally also limited by user-selected criteria (e.g., "restaurants"). The website then presents imagery from which the user can select for posting on a social networking service.

By such arrangement, for example, a user at home in St. Louis may browse restaurants in Napa Valley, Calif., and post menu images that appeal, to a "Let's Eat" pinboard on their Pinterest account.

In an alternative implementation, attractions—such as restaurants—can provide imagery to a user in exchange for receiving something from the user. For example, the Napa restaurant may provide the user in St. Louis with access to a gallery of photos showing dishes prepared at the restaurant, in exchange for the user providing information not readily available about themselves. Such information may include their email address, temporary access to their Facebook graph, etc. (Agent software associated with the restaurant's web page can handle such transactions in automated fashion—including collection of data from the user, and providing imagery.)

In another particular arrangement, images are provided to a user from an online repository based on the user's current position (e.g., as indicated by GPS or other location technology). Thus, if wandering in the menswear section of a department store, the user can review images of products that others have posted while in that same section (e.g., as determined using geolocation data associated with the prior images).

An app providing such functionality can include a first UI control that allows the user to specify a distance within which the prior images must have been posted, e.g., within 15 feet or 75 feet of the user's present location. A second UI control allows the user to specify a time window within which the prior images must have been posted, e.g., within the past week or month. Images meeting both of these user-set parameters are presented to the user in an order starting with closest-in-location, and ending with most-remote-in-location, irrespective of time. Alternatively, images meeting these parameters are presented to the user with the most recent first, irrespective of location.

A retailer can make use of such location-based social network posting data to identify areas of a store where users most commonly seem to engage in social network activity. The retailer can then place signage or other marketing displays in such areas, with the expectation that users might post from such displays to social networks.

Pinterest can have a partnership with Foursquare (or other location-based social networking site) by which pinning an image to Pinterest from a particular geographical location serves as a "check-in" to Foursquare from that location (helping the user earn points, badges, and other awards). Similarly, to promote use of social networking in-stores, a retailer can provide incentives (coupons, cash-back, etc.) when a user posts, e.g., 5 or 10 photos captured in a store.

Pinterest can also expose the geolocation data from which users pin photos, to populate a map showing Pinterest activity, e.g., at different locations in a city. A visitor to the city can view the map and click on pins (or thumbnails) representing different Pinterest posts, as a way of scouting different neighborhoods to see what they have to offer.

Instead of a map view, a smartphone app can present a monocle view—overlaying pins (or thumbnails) on live imagery captured by the smartphone camera when the user points the phone in different directions (a form of augmented reality)—showing what social network posts people have made in different directions from the user's current location.

Sentiment Surveys

In accordance with yet another inventive aspect of the present technology, software performs a data-mining operation to discern consumer sentiment from social network postings.

An illustrative embodiment comprises software that crawls public Pinterest pinboards, Facebook pages, or Flickr looking for depictions of a manufacturer's products. For example, Campbell Soup Company may search for depictions of its soup cans.

This effort is aided because many such depictions will be product marketing photos distributed by Campbell itself. Similarities between pictures posted to social networking sites, and reference copies of Campbell own marketing imagery, can quickly be determined, e.g., using known image fingerprinting techniques.

On Pinterest, many such photos will have associated URLs that point back to the web page at Campbell Soup Company on which the original image appears. Thus, the URLs posted to Pinterest can be crawled, looking for . . . campbell.com . . . in the URL.

User-captured photos of Campbell's products—not originating from Campbell, can be identified based on known image features—such as a cylindrical shape, mostly white on bottom and mostly red on top, etc. Image similarity metrics, such as corresponding SIFT features, can be used for this purpose.

For each posted image, the software harvests any user-authored metadata, e.g., "My husband's favorite" or "Never again." These annotations are then semantically analyzed to categorize them into two or more sentiment classifications (e.g., endorsement, nostalgic, critical, etc.). A statistical breakdown of such results is then provided back to Campbell's, which can use such information in upcoming marketing and other efforts.

(Sentiment analysis of text is a large and growing field. Exemplary methods are detailed in patent publications 20120041937, 20110144971, 20110131485 and 20060200341.)

Attribution

In accordance with a further inventive aspect of the present technology, digital watermark technology is used to identify a user who first posted an image to a social network, and credit that user for its further distribution on the network.

On Pinterest, when User A re-pins a photo that appears on a pinboard of User B, User B is identified on User A's pinboard (in metadata) as the source. However, if User B repined the photo from user C, user C gets no credit. Only the immediate "parent" of a pin gets credit—earlier parties in the content distribution chain are forgotten.

This seems unfair. Much beautiful content is posted on social networks, and the credit for such content should most properly go to the user who first introduced it to the network.

In an exemplary embodiment, when a user introduces external imagery to a social network (as opposed to re-pinning or copying imagery from another user's posting), the image is encoded with a steganographic digital watermark. This watermark conveys a plural bit data payload that serves to identify this user. For example, the payload may be a unique 36-bit user number, which is associated with the user's name and other information via a table or other data structure.

When this image is thereafter re-posted (or re-re-posted, etc.) by another user, the image is analyzed to extract the steganographically-encoded digital watermark data. By reference to this data, the member of the social networking service who first posted the photo is identified. The social networking service can then publish information (e.g., wherever the image is re-posted) giving this original poster credit for having introduced the photo to the network.

The social networking service can similarly publish a listing of all the users who re-posted the photo. This may be done, for example, on a web page associated with the original poster.

Also, the service can publish a ranking of members—showing a number of times that their respective originally-posted photos were most often re-posted on the social networking service. Members may vie to be among the top-ranked entries in such a listing.

Mischief Deterrence

Just as a dissatisfied consumer may establish a gripe web site (e.g., mitsubishisucks<dot>com), which hosts web content critical of a certain company, so too may a user post an image to a social networking site, intending to lead viewers to critical content.

While the web is a good forum for unlimited expression, social networking services—particularly those that rely on advertising revenue—may prefer to place some limits on user expression.

Consider the case of a user who is critical of Nike. Such a user may copy a shoe image from the Nike web site to a gripe site, and then post the image (i.e., by its gripe site URL) to Pinterest. Users who encounter the image on Pinterest and click on the image will be redirected to the gripe site (even if the image is removed from the site after pinning), instead of to the original Nike site. Nike may take a dim view of this, especially if its marketing efforts include a presence on Pinterest.

To discourage such conduct, Pinterest may check each image newly posted to the service, to see if it matches an image earlier posted. Such checking can be done by computing image fingerprint data (e.g., SIFT features) for each new image, and comparing it against fingerprint data for previously-posted imagery. (A "match" can be more than exact identity. For example, the image fingerprint data may enable detection of the same photo at different resolutions, or with different coloration, or after cropping or other image editing operations, etc.)

If Pinterest finds that a photo newly submitted for posting corresponds to one already posted, it can then compare the metadata of the two photos. This metadata may include the associated URLs that point to the web locations from which they were respectively "pinned." Based on an outcome of such comparison, the social networking service can take an action.

For example, if the service finds a user is posting a new image that matches one previously posted, and if the one previously posted has a URL at the nike<dot>com domain but the new one links to a different site, the service can amend the URL link of the new image to match the URL of the previously-posted image.

Alternatively, the social networking service may simply send an automated message (e.g., by email) to Nike alerting it to the posting of a matching image with a non-Nike URL, and providing Nike with associated information for review.

Still another option is for Pinterest simply to decline to accept the pin. A notification may be sent to the person who attempted the pinning, e.g., reporting that the image should link to the Nike domain.

The action to be taken in a given instance can be determined by reference to rule data, stored in a database by the social networking service. The rule data for a particular image may be provided by the proprietor of the web site from which the image was originally pinned (e.g., Nike). Such image proprietor may pay or otherwise reward the social networking service for storing and enforcing such rules.

For example, by a web interface, or otherwise, Nike may submit rule data to Pinterest specifying that whenever Pinterest detects a newly pinned image that matches an image previously pinned from the nike<dot>com domain, and the newly pinned image does not also link to the nike<dot>com domain, then metadata of the newly-pinned image should be amended to match the metadata of the previously-pinned image. Campbells, in contrast, may submit rule data simply instructing Pinterest to send an electronic alert whenever such condition arises for an image originally pinned from the campbells<dot>com web site.

Image watermarking can similarly be used to deter such mischief. For example, if Nike wants to ensure that images on its website always link to its website (i.e., that its images are never repurposed to link to another domain), it can digitally watermark such images with the payload "nike<dot>com" (or it can watermark the image with a unique alphanumeric identifier that resolves to "nike<dot>com" in a watermark database). Pinterest can check all images pinned to its social network site for embedded digital watermarks. When it finds an embedded watermark payload (e.g., "nike<dot>com"), it can check that the URL associated with this link is at the Nike domain. If not, it can decline to accept the pin, or take other responsive action, as detailed above.

Such arrangements are useful to ensure that images for branded products always link back to their respective brand owners.

Posting Images from Video

Audio information can be used in posting images from video to social networking sites.

Consider a user who is watching Saturday Night Live, and wants to post an image from a skit to the user's Pinterest site. Using a smartphone, the user captures audio from the program. A processor—in the phone or at a remote site—processes the captured audio to derive identification data from it, such as by digital watermark decoding or audio fingerprinting.

This identification data is used to access a store of content related to that program. This store may include an ISAN content identifier, and may also include a pointer to an online gallery of still image frames, e.g., provided by the producer of the television program for marketing purposes. (Or, a different database accessed using the ISAN identifier may include such a pointer.) The user reviews the gallery of marketing images—on the smartphone screen or on another screen—and pins one or more desired images from this gallery to Pinterest (i.e., sending a URL for the desired image—identifying its location in the online gallery—to Pinterest).

Figure 17:
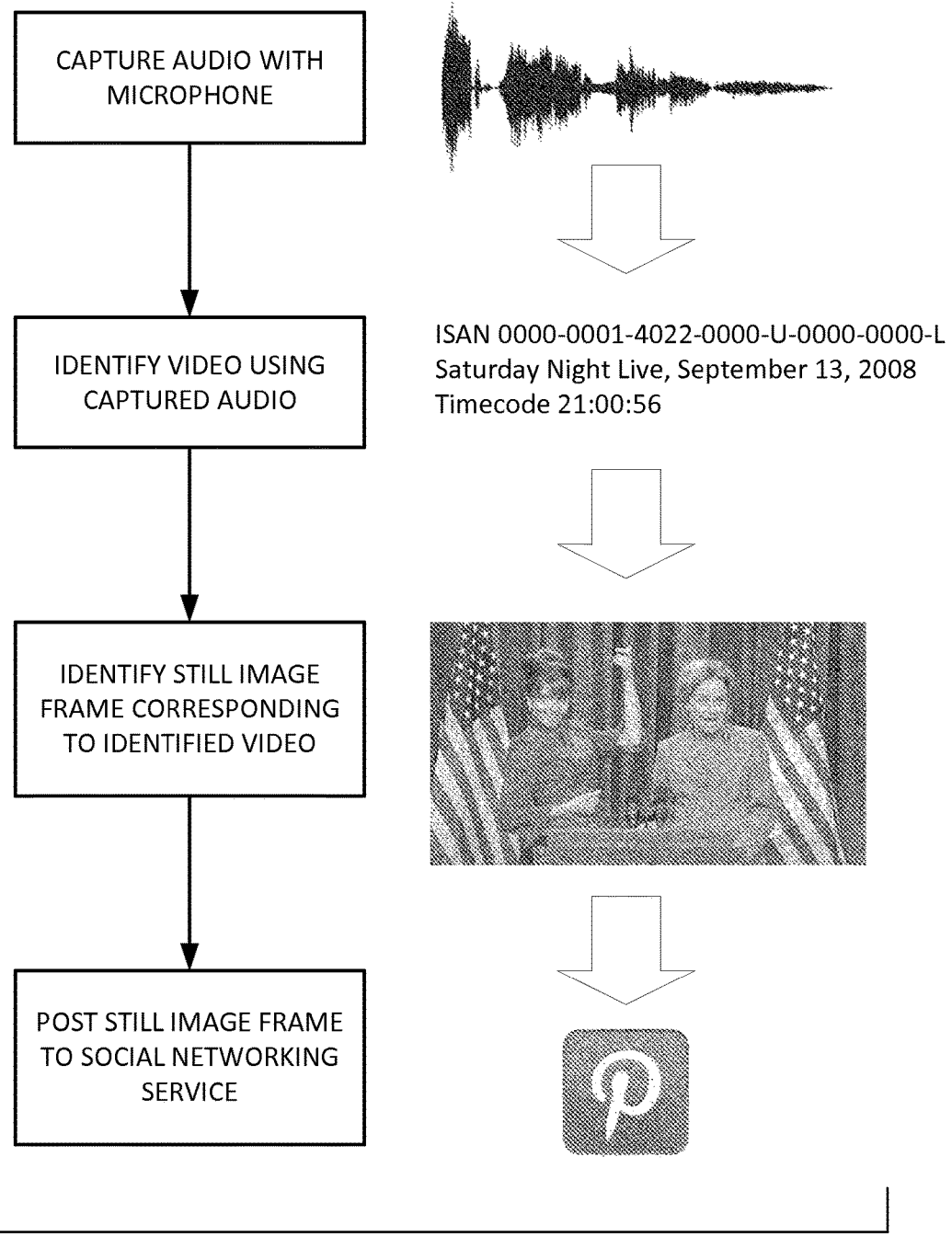
FIG. 17 illustrates an embodiment in which still image frames are identified by reference to audio.

FIG. 17 illustrates such a method.

Audio Accompaniment

Relatedly, images posted to social networking services can be associated with corresponding audio or video clips. When a user taps such an image on a smartphone (or hovers over such an image with a mouse on a desktop computer), identifying information is extracted from the image data. (Again, digital watermark decoding or image fingerprinting techniques can be used.) This identifying information is used to access a data store in which content related to the image is stored. This content may include audio or video information, or a link to same. Such audio/video content is rendered to the user—either automatically, or in response to a further user instruction.

In some embodiments, a short (5-10 second) snippet of compressed low bandwidth audio (e.g., 3 Khz) is steganographically encoded into an image (e.g., by a fragile watermarking technique, such as least bit substitution). When the user taps or hovers over the image, the audio is decoded and rendered directly from the image data.

By such arrangements, a user can, e.g., annotate a Pinterest image post with commentary about the subject depicted in the image, or capture concert audio to accompany a photo of a band performing.

Use in Retail Stores

The present technology finds many applications in retail settings.

One arrangement makes use of signage at a store (printed, or displayed on an electronic screen), depicting a product offered for sale. With a camera of a portable device, a user captures a photo of the sign. Identifying information (e.g., watermark or fingerprint) is then extracted from the captured image data.

The identification information is then used to access location information for the depicted product within the store. For example, this information can reside in a database maintained by the store, or a more global database—serving many different stores—can be employed.

The information accessed from the database can also include navigation instructions to guide the user from the sign to the product location (e.g., using turn by turn directions leading the user through the store aisles, and/or a store layout map with one or more arrows overlaid—depicting the route). Or, such instructions can be computed dynamically—based on the user's present location (as sensed by software in the user's device), using known indoor (in-store) navigation software tools.

Another arrangement makes use of images previously posted to a user's social networking site, to discern user interests. Alerts can then be provided to the user based on nearby products.

Consider a user who posted an image of Jimmy Choo motorcycle boots to her Pinterest page. When the user thereafter is near a retail establishment that stocks these boots, a push notification may be sent to the user's phone—alerting her to the product, and the store location.

The correspondence between the boot image posted to the user's social network account, and the store product, can be discerned in various ways. One case is where the user has pinned the image from the store's web site. For example, if posted from the Nordstrom site, the post may comprise the Nordstrom URL: shop<dot>Nordstrom<dot>com/s/jimmy-choo-motorcycle-boot/3069637?cm_ven=pinterest&cm_cat=pinit&cm_pla=site&cm_ite=3069637.

Software on the user's phone can maintain a list of the domains from which images are pinned (e.g., target<dot>com, nordstrom<dot>com, etc.) and can periodically check whether the user is near any of these stores. ("Near" is a parameter that can be user-set, e.g., within a mile, within 100 yards, within 10 yards, within wireless range, in-store, etc.) The presence of such a store can be determined by reference to Google Maps or the like, through which the user's location on a map can be compared with known locations of different stores. Another alternative is for stores to send out wireless data (e.g., a WiFi network naming the store, Bluetooth, or ultrasonic audio) announcing themselves. Still other implementations can involve the user device periodically updating a web service with the device location. The web service can then determine proximity to different stores, and may also have knowledge of the web domains from which the user has posted images, so that nearness to one of those stores can be determined.

Once the user is found to be close to a Nordstrom store, the user device can send the image URL to the store, e.g., by Bluetooth, WiFi, etc. The store applies the received URL to a data structure that maps different web page URLs to the corresponding SKUs or UPCs (or other in-store identifiers) for those products. The store then checks its electronic inventory records to determine whether the item indicated by the received URL is in-stock. If so, an alert is sent to the user device, for display to the user on the device screen.

Instead of being posted to the user's social networking site by a domain-specific URL, an image may also be posted by reference to a UPC identifier (e.g., decoded from a barcode or other indicia). The user device may periodically broadcast—by WiFi, Bluetooth, etc., a list of UPC identifiers for items depicted on the user's social networking site. Nearby stores that receive such broadcast can check their inventory to determine whether any of the thus-identified products is in their inventory. If so, an alert can again be transmitted for display to the user.

Instead of broadcasting such a volume of data, the collection of UPC identifiers can be stored in an online repository associated with the user. The user device can simply periodically broadcast an identifier by which stores (or associated web services) can access this repository. Nearby stores that receive such broadcast can access the online list using the broadcast identifier, and alert the user if any match is found.

In some embodiments, descriptive text associated with an image posting is used to identify a product of interest to the user. For example, from the Nordstrom URL given above, the text Jimmy Choo Motorcycle Boot can be extracted. Many URLs similarly include semantic text (e.g., most Amazon URLs incorporate such text). Such text-based product descriptors can be periodically broadcast from a user device (or an identifier of an online repository where such descriptors is stored can be broadcast), and nearby stores can check their inventory to determine whether any product having such a descriptor is in-stock. Again, corresponding alerts can be issued.

In other cases, the URL itself does not include descriptive text. However, such descriptive text can be extracted from the web page to which such a URL points. (This is particularly the case if Web 2.0 technologies are used—labeling the different web page components, e.g., including Product-Name.)

Other embodiments use image fingerprint or watermark data. That is, fingerprint/watermark data for images posted to a user's social networking service can be computed and then broadcast (or stored in an online repository, accessed by an identifier that is periodically broadcast). Nearby stores can compare these identifiers with fingerprint/watermark identifiers for reference photos depicting in-stock products. Again, if any match is found, the user is notified.

Given one type of identifier (e.g., a URL, a UPC code, image fingerprint data, watermark data, descriptive text, etc.), an online data store (e.g., a translation table) can provide one or more corresponding identifiers of other types (URL/UPC/fingerprint/watermark/text, etc.), which can be used in the presently-detailed arrangements. Such translation tables can be provided by individual retailers, or an independent operator can host such a service for a larger variety of products.

In embodiments in which the user device periodically broadcasts information to nearby stores, battery life can be preserved by actuating such functionality only when the device location is determined (e.g., by GPS or the like) to be within an area having a store nearby (or having a concentration of multiple stores within a small region, such as 10 or 50 stores within 1000 feet—such as in a shopping mall). Google Maps and other online services can provide such information about the locations of stores.

In the foregoing arrangements, an alert can also (or alternatively) be issued when the user is near a store that stocks a product depicted in an image posted by a social network "friend" of the user. This can facilitate shopping, e.g., for birthday gifts.

The alert provided to the user can include the photo of the object from the social networking site.

In a variant arrangement, stores or malls can offer a shopper concierge service. A shopper sends a link to one or more pinboards, and an employee researches the availability of the depicted merchandise at that store/mall. When the shopper arrives, the concierge greets them and accompanies them directly to the merchandise depicted on the pinboard(s).

In still other arrangements, a store sends a gallery of photos to a nearby user. Included first in the gallery are any in-stock items that are among those pictured in the user's social networking sites. Next are presented any such items that are among those posted by the user's friends. Finally, the store may include photos of items that are most frequently posted by other social networking site users (optionally, those with demographic profiles most similar to that of the user).

In some implementations, the user needn't be physically near a store to take advantage of such functionality. Instead, the user can place themselves virtually at different locations, to explore different shopping opportunities. For example, if a user plans a Christmas trip to New York, the user can virtually place themselves at different locations in the shopping district (e.g., by a UI that allows entry of a remote location), and see what products depicted on their social networking site are available, and where.

The above-detailed functionality can be integrated into a software app offered by a store (e.g., Nordstrom), or tools generic to different stores can be employed.

Sometimes a store may not have photos of all the products stocked on its shelves. Or a store may wish to author a Pinterest page showing customer favorite products—with a minimum of effort. To fill such needs, the store may rely on crowdsourcing, i.e., photos captured by shoppers.

For example, a retailer may search online photo collections (e.g., Flickr, Pinterest, Facebook, etc.) for photos that have accompanying metadata indicating the photos were captured within their store. This metadata may comprise, e.g., latitude/longitude data that was stored by the user device at the time of image capture, or it may comprise a text annotation provided by the user (e.g., "Saw these shoes at the downtown Portland Nordstrom store.") Such images can then be re-purposed by the store, such as re-pinning onto the store's Pinterest page. (Known facial detection techniques can be applied to such imagery before such re-purposing, to ensure that no recognizable individual is present in any such photo.)

Alternatively, a store's WiFi network can use packet sniffing to detect image traffic sent from within the store to Pinterest. When encountered, it may copy such images and re-purpose them for its own use. (Naturally, such sniffing and repurposing should only be employed where expressly authorized by the user, such as in terms of use to which the user agreed before using the retailer's WiFi network.)

Related arrangements can be employed by public attractions other than stores. For example, the city of Portland, Oreg. may compile a Pinterest pinboard showing photos of its city parks, by reviewing public photo postings depicting imagery captured within geographical boundaries of the city's parks.

Some retailers may create a Pinterest board for each aisle in their stores—showing photos captured by shoppers while in those respective aisles. (Indoor positioning technology with resolution fine enough to identify a user's location by aisle is known, e.g., as detailed in U.S. Pat. Nos. 7,876,266 and 7,983,185, and published US Patent Application 20090213828.) Or even finer geographical or topical granularity can be employed, e.g., cotton sweaters on one pinboard, neckties on another, etc.

While most of these embodiments involve user interaction with smartphones, other arrangements can alternatively (or additionally) involve user interaction with public electronic displays. For example, a touch-screen display panel at the entrance to a Nordstrom store, or at the entrance to a mall, can display images (which may be posted to and presented from one or more Pinterest pinboards), showing popular products.

Popularity can be judged in various ways. For example, cash register sales data from the past week can identify products that have had the highest unit or dollar sales, or the display can show products available in the store/mall that have most often been posted to Pinterest. Still another arrangement shows a scrolling timeline ticker of images—depicting each item in the store/mall as it is purchased, or posted to a social network.

Shoppers can interact with the electronic display by tapping photos of interest. While many different responses are possible, one responds by identifying the product by name, price, and location in the store/mall. Additionally or alternatively, the tapped image may be re-pinned to the shopper's Pinterest board.

To enable re-pinning of publicly-displayed images to the user's account, the user may be presented with a login screen to enter Pinterest log-in credentials. Perhaps preferable is for such information to be automatically and wirelessly conveyed from the user's smartphone to the electronic display system—in accordance with user-set rules about conditions in which such data can be shared.

Still better is for the tapped image to be re-pinned to the shopper's Pinterest account without providing any credentials to the display system. Instead, the app on the shopper's smartphone can send data indicating the phone's location to Pinterest (or an associated web service), which uses this information to identify a public display nearest to the shopper. Pinterest then asks the display to send it data indicating the image that was most-recently tapped. Pinterest then re-pins that image to the user's account. (The smartphone app may first display the image that Pinterest deduced was of interest to the shopper, inviting user confirmation before it is pinned.)

In yet another arrangement, Pinterest takes the location information made available from the phone, and provides the smartphone app with a copy of the pinboard information being displayed on the nearest public electronic display (re-formatted for presentation on the smartphone display). The user can then scroll and select from among these images for re-pinning. In some embodiments, a dynamic stream of images is presented on the smartphone—corresponding to changing imagery presented on the public display. If the user moves from that location, the feed of imagery may continue. (While taking a break at a mall coffee shop, the user may thereby review what items are being sold, e.g., at Nordstrom.)

In other arrangements, pinboard data is made available to the user's smartphone only so long as the user is in proximity to the public display (or other location with which a pinboard is associated). The data provider (e.g., Pinterest) may require the app to send it current location data every minute, and if none is received (or if the data indicates the user has moved outside of a zone associated with a particular pinboard), then no new data is provided.

(Still another option for re-pinning an image shown on a public display is to use the techniques detailed earlier, e.g., based on capturing the displayed image with the smartphone camera, and recognizing same by image fingerprinting or watermarking.)

Social Discovery

Imagery can provide a means for discovering users with similar interests.

Consider a first user who takes a photo of a particular book while at a bookstore, and posts it to the user's social network account. The social network service analyzes the image (e.g., by calculating fingerprint data) and matches it to two other images previously posted to the social networking service by two other users. The social network service can then notify the two previous users about the first user's new post about the same book, and can likewise alert the first user to the two previous users' posts (all subject to privacy safeguards, such as opting-in to such service). This notification may comprise only the photo(s) taken by the other user(s), or it may comprise more extensive information—such as other photos posted by such user(s).

In some embodiments, such notifications only occur if the photos were captured at the same location (e.g., at the same bookstore).

Pinterest-to-Print

Images from Pinterest can be used to compile print documents—such as cards and booklets. For example, a user's friend may be a Ducati motorcycle enthusiast. The user can compile a pinboard of Ducati motorcycle images, and use a printing option on Pinterest (or a third party service provider) to produce a bound booklet of such photos, which is then mailed to the user (or is mailed to the friend, or is held for pickup at a nearby print shop).

Each image in the booklet can be watermarked. If the friend wishes to learn more about any of the depicted Ducati motorcycles, she can capture imagery from the printed booklet with a smartphone app that decodes the watermark information, and leads to the web site on which the image is hosted.

Similarly, a user who is on vacation in Europe can browse Pinterest for images related to his trip, and direct that they be printed and mailed as postcards from the United States, with personalized messages.

Reconciling Resolutions

Situations can arise in which different parties may want a decoded watermark (or other recognized content) to trigger different payoffs. For example, one party may be a publisher of a watermarked advertisement, while the other party may be a distributor of a watermark-reading app for smartphones. Whose payoff preference should prevail?

Consider EBay. It may offer a smartphone app that reads watermarks. (It already offers such an app for reading barcodes.) When it reads a watermark from a magazine ad for a Rolex watch, the decoded payload may point to a record in a backend database that identifies the watch by model number, and provides a URL to a Rolex web site that identifies authorized resellers. The EBay app may disregard the URL information, and instead use the model number information to link to an EBay web page presenting dozens of such Rolex watches for sale.

The advertiser, Rolex, may take a dim view of this. Having paid for the advertisement, and having taken the effort to provide a watermark, it may want its specified URL used as the payoff, so that viewers of its magazine ad are provided information about authorized resellers.

As another example, consider Amazon. Sometimes it may partner with brand owners to promote sales through Amazon's web site. It may offer incentives, for example, for the watermark used in a Wilson Sporting Goods ad to point to a backend database record having a URL identifying an Amazon page from which the advertised Wilson product can be purchased. The URL identified by a watermark in an advertisement for Wilson's "Blacktop Warrior" basketball may thus be www<dot>amazon<dot>com/Wilson-Blacktop-Warrior-Basketball-Orange/dp/B001URVJ0W/ref=sr_1_8?

An EBay app encountering such advertising may access the database record and obtain the URL data. Instead of using the URL to link to Amazon, however, the EBay app may extract semantic information from the URL (i.e., Wilson Blacktop Warrior Basketball Orange) and repurpose this information to link to EBay web pages that offer the same Wilson basketball for sale.

More generally, there may be multiple sources of preference information, e.g.: (1) the party that encodes the watermark, (2) the app that reads the watermark, and (3) the consumer who uses the app. The following disclosure details a few of various ways that the preferences of the various parties can be reconciled.

In one particular embodiment, watermark payloads may have associated PurchaseAttribute data. This data can form part of the payload information that is literally conveyed by the watermark in the media object or, more commonly, this data is stored in a database record indicated by the encoded payload. The PurchaseAttribute data indicates the preference of the party responsible for the watermark—indicating how any purchase initiated from the watermark should be fulfilled.

FIGS. 22A and 22B illustrate how watermark information decoded from a magazine advertisement is handled differently by two different smartphone apps. One is an EBay app that is specialized for purchasing products from EBay. When it is launched, the app presents a splash screen with the name "EBay" (which is stored with other program information), and launches a camera application to capture imagery. The other app is similar, but not associated with a particular retailer. The Digimarc Discover app is one such example.

Both applications start by processing imagery captured by the smartphone camera (e.g., from a magazine page or product packaging) to decode the plural-bit watermark payload. They then access information in the database record that corresponds to this payload. PurchaseAttribute data may be among the data stored in the database record and encountered by the apps.

If PurchaseAttribute data is present, the FIG. 22A EBay app next checks whether this data includes the string "EBay" (or other EBay-identifying information). If so, the application branches to a routine (not particularly detailed) for purchasing the product, employing EBay sign-in credentials previously stored by the user.

If, in contrast, PurchaseAttribute data is present, but doesn't include EBay-identifying information (e.g., it includes "Amazon") then the EBay app understands that it should not invoke the routine to purchase the product through EBay. Instead, the application branches to a graceful exit.

The graceful exit may not require the EBay application to terminate. Instead—functionality other than purchasing on EBay may be pursued. For example, the EBay application may provide information about the product—such as from a manufacturer's web site. Alternatively, the EBay application may provide the user with information about completed EBay transactions involving the product—indicating the prices paid by others. Another alternative is for the EBay application to provide a recommendation of another application that is preferred for use with that watermark (per application-identifying data provided from the database). The EBay app may even provide a link that the user can follow to Amazon, although this would be unusual.

Sometimes the watermark-associated database record may not have any PurchaseAttribute data. In this case, the EBay application (FIG. 22A) may invite the user to purchase the subject item on EBay.

If a watermark is read from editorial content (such as a national Geographic article) a related, purchasable product may be derived by the EBay app from the information returned by the database. For example, if the article concerns Hawaiian history, EBay might provide links to Hawaiian vacation packages, Hawaiian art, etc.

Similarly with novelties such as a baseball trading card. One link may be to a video about the baseball player. Another link presented by the EBay app may be to memorabilia involving that player, for sale on EBay.

The database record may include data indicating whether the item associated with the watermark is purchasable. Alternatively, the watermark payload itself may reveal this information. In a particular embodiment, the latter approach is used. If the watermark payload is an even number (e.g., in hexadecimal), this indicates the item is purchasable. If odd, then not.

Another approach is with payload versioning. The watermark payload may be extensible, so that it can be extended to accommodate additional information as-needed.

In the case of a National Geographic article, the graceful exit shown at the left side of FIG. 22A can comprise the EBay application linking to a National Geographic web site associated with the article.

FIG. 23 details an excerpt of a database to which the smartphone apps link when they encounter a watermark. The first entry is the watermark payload. This is the index by which the app identifies the record (row) in the database corresponding to the just-read watermark payload. The next entry is the PurchaseAttribute data, specifying an authorized vendor(s) of the item associated with the watermark payload.

Next is name text associated with the watermark payload. This text may be presented to the user as part of the app's response to reading a watermark. Also provided is a class of the item (e.g., electronics, books, movies, groceries, household, etc.) Following that is an entry containing a product identifier—such as an EAN or UPC number.

The database record further includes a web link that can be used by the app to present more information about the item associated with the watermark. The next entry in the row is a URL that can be used for the app to present a purchase opportunity to the user. (In some implementations, this web link serves as the PurchaseAttribute data, since it typically includes the name of the authorized vendor(s).

The database record may also comprise further information, as may be dictated or desired by the particular implementation. For example, the database may include a reference to another database that the phone app can query for additional information. Additionally, as noted earlier, the application may present a variety of different links that the user can pursue—instead of just the one or two links per payload shown in FIG. 23.

(In some implementations, the database record corresponding to the watermark may be sent from the database to the smartphone, in response to a smartphone query.)

Returning to FIG. 22A, if the EBay app decodes the watermark payload 43DF8A from packaging for Sony headphones, it will find—from the first row in FIG. 23—that EBay is not a permitted vendor for this item. (Amazon is specified.) Accordingly, the flow chart of FIG. 22A indicates that the app will branch to a graceful exit, rather than continue towards offering the user a purchase opportunity on EBay.

If the EBay app decodes the watermark B163A4 from a magazine advertisement for Kleenex tissues, it finds—from the third row in the FIG. 23 database—that there is not a PurchaseAttribute set for such item. Since the payload (B163A4) is an even number, the app understands that the item is a purchasable product. So the app follows the branch to the bottom of the FIG. 22A flow chart—proceeding to present a purchase opportunity with the user's EBay account. (Although no EBay link to the product is stored in the database, the app can conduct an EBay search based on the Name Text data provided from the database.)

If the EBay app decodes the watermark C4FF31 from a National Geographic article, it finds that there is no PurchaseAttribute data. It further finds that the associated item is non-purchasable, since the payload is an odd number. So the EBay app then branches to a graceful exit, e.g., by linking to the National Geographic web site associated with the article, per the link in the WebLinkforProduct field of the database record. Or, as noted above, the EBay app can derive a destination in the EBay site, based on metadata provided from the backend database (e.g., Egyptian-themed items for sale on Ebay).

FIG. 22B shows a flow chart governing operation of the Digimarc Discover app. Again, the depicted process begins by checking the PurchaseAttribute data (if any) associated with the watermark payload decoded by the app. If there is no such PurchaseAttribute data, the app next checks whether the item is purchasable (again by reference to whether the payload is even or odd). If it finds the item is not purchasable (e.g., the watermark is from a National Geographic article), the app responds as in the foregoing paragraph.

(This app may decide—in part—whether to derive a purchase opportunity from the metadata, or simply link to an informational page, based on the clue of having purchasing credentials for the user that could be used in a derived purchase opportunity scenario.)

If the Digimarc app finds, instead, that the item is purchasable (e.g., it senses payload B163A4 from a magazine advertisement for Kleenex Auto Pack), it next checks whether the user has specified preferred product fulfillment vendors for such item (e.g., Amazon, EBay, Target, WalMart, etc.). If so, the app queries the user-preferred vendor to determine whether the Kleenex item is available for purchase. If it finds the Kleenex product available from the user-preferred vendor, it readies a purchase transaction for the Kleenex item from that vendor, which the user can elect to complete or not. (If the item isn't available from user-preferred vendor, the app can check second-/third-/etcetera-choice vendors that may have been specified by the user, before resorting to a programmed list of still-further alternative vendors that may be tried.)

Returning towards the top of the FIG. 22B flow chart, the Digimarc app may find that the item indicated by the watermark has a corresponding database record that specifies (in the PurchaseAttribute field) a particular vendor that should be used in purchasing that item (e.g., as may be the case if Amazon sponsors a print ad for a Wilson basketball). When the Digimarc app thereby learns that a purchase opportunity should be presented—if at all—from the Amazon web site, the app next checks to see if user-stored credentials are available for Amazon. If so, the app readies a purchase transaction for the user's confirmation, using rule data earlier specified by the user (e.g., sign-in with particular Amazon user-name and password, and then elect payment by Amazon's One-Click option, which is linked to user's VISA card). If no user-stored credentials are available, the app gracefully exits—such as by presenting details about the basketball from the Wilson or Amazon web sites, or by inviting the user to manually log in to Amazon and complete a purchase.

FIG. 24A shows a sample data structure (table) in the memory of the user's smartphone—detailing preferred vendors for different classes of items. For example, if the item corresponding to the watermark is a book (e.g., as determined by the Class data in the FIG. 23 table), then the Digimarc app should first check the Amazon Kindle store for availability of the book. If available, the app gives the user the option to purchase with a single tap of the touchscreen. If unavailable from Kindle, the app should next check for availability at Half, and then at Abebooks, and then at Amazon (i.e., for a paper version).

The FIG. 24A data structure has different lists of preferred vendors, depending on the item class. For a grocery item, the prioritization may be Safeway, then Amazon, then EBay. For electronics, the prioritization may be Best Buy, then EBay, then Amazon. Etc.

Further information associated with the vendors in the FIG. 24A table is provided in the FIG. 24B data structure. This table provides the URLs, user credentials, and rule information associated with the various vendors specified in FIG. 24A.

The password data is depicted in FIG. 24B in cleartext. In actual practice, it would be better secured against hacking, such as by a reference to an entry in an electronic vault, or by information in an electronic wallet. Similarly, the information for the user's credit cards is desirably not stored in clear text. Instead, the reference, e.g., to Mastercard in FIG. 24B may comprise a tokenized reference to a mobile wallet. Such arrangement may store the actual Mastercard number in the cloud. For some login/password/payment data, FIG. 24B may specify that the user should be prompted to enter the information as needed.

Information in the tables of FIGS. 24A and 24B needn't all be manually entered by the user, in a configuration process. Instead, a process can derive the table data from inspecting available purchasing credentials and examining the user's past purchasing activities.

Typically, access to the database is subject to a license agreement. This license agreement can contractually require that software using the database operate in accordance with the PurchaseAttribute data, etc.

Of course, the flowcharts depicted in FIGS. 22A and 22B are representative only. Many different arrangements can be employed, depending on the particular needs and circumstances faced by the implementer. And while described in the context of watermark information, the detailed approaches can be adapted for use with other identification technologies—such as barcodes, fingerprinting/feature recognition, etc. In still other embodiments, such principles can be applied to audio content—using audio watermarking or fingerprinting.

While the detailed arrangement focused on applications that can be used for product purchasing, other applications may not include or desire such capability. Instead, such other applications may serve educational, or artistic, or entertainment, or other ends.

Similarly, the party responsible for watermarked imagery may have preferences as to its use (educational, artistic, entertainment, etc.).

In a more general embodiment, the party responsible for the watermarked imagery stores metadata, in a backend database, expressing preferences/limitations/rules concerning actions to be taken based on the database information. If such a limitation is expressed, the application software should respect that requirement. The application software, too, may have its own data detailing behaviors that it wants to enable—both based on preferences of the software provider, and also based on the software user. The application software thus follows a multiply-tiered set of rules—first applying any requirements imposed by the watermark metadata, and then behaving in accordance with its own rules, further customized by the user-stored information (or derived from historical user behavior data).

In a particular example, backend rule metadata associated with a watermarked photograph in Martha Stewart Living magazine may specify that the database information is to be used only (1) to post the photograph to Pinterest, (2) to link to a website corresponding to the article in which the photograph is included, or (3) to "Like" the article on Facebook.

A Pinterest app encountering such a photograph could naturally pin the photo to the user's Pinterest account. And a Facebook app could allow the user to "Like" the article. However, an EBay app could not use the backend data to initiate a purchase on EBay (although it could, if it its programming allowed, link the user to the website corresponding to the article).

The metadata of FIG. 23—which includes rule data about item purchasing (i.e., the PurchaseAttribute data), can additionally include rule data specifying how the item corresponding to the watermark may be socialized (e.g., by Twitter, and/or by Facebook, and/or by Google+, etc.). If the metadata authorizes socializing the item on Facebook and Google+, but the user has provided credentials only for Google+, then only that option for socialization will be presented to the user.

Although not detailed in the flow charts of FIG. 22A/22B, the WebLinkforProduct data can further serve as a rule that enforces how additional information about the item should be obtained (e.g., from the manufacturer's site, as opposed to a more general Google search—which may lead with commercial advertisements).

The metadata of FIG. 23 is available to all applications. There may be additional metadata which is private, and made available only to certain software applications. For example, if a photograph in House Beautiful magazine is watermarked, and is read by a House Beautiful smartphone app, that app may be provided metadata in addition to that provided to, e.g., an EBay app. By such private data, the House Beautiful app can enable watermark-responsive behaviors that other applications cannot provide.

(More information on use of watermark metadata and its uses is found in published patent application 20070156726.)

Printed Response Codes

In accordance with another aspect of the technology, a response code is included in printed content, such as advertising, newspaper/magazine editorial content, product packaging, etc. However, unlike known response codes (e.g., QR codes), the present code includes semantic information for human viewers. Such information can include, e.g., logos for social networking services—informing viewers as to the action(s) that the code can launch. While providing various benefits to the readers, use of such codes also leads to electronic gathering of usage metrics for print publications—a feature generally unavailable to print publishers.

Figure 25:
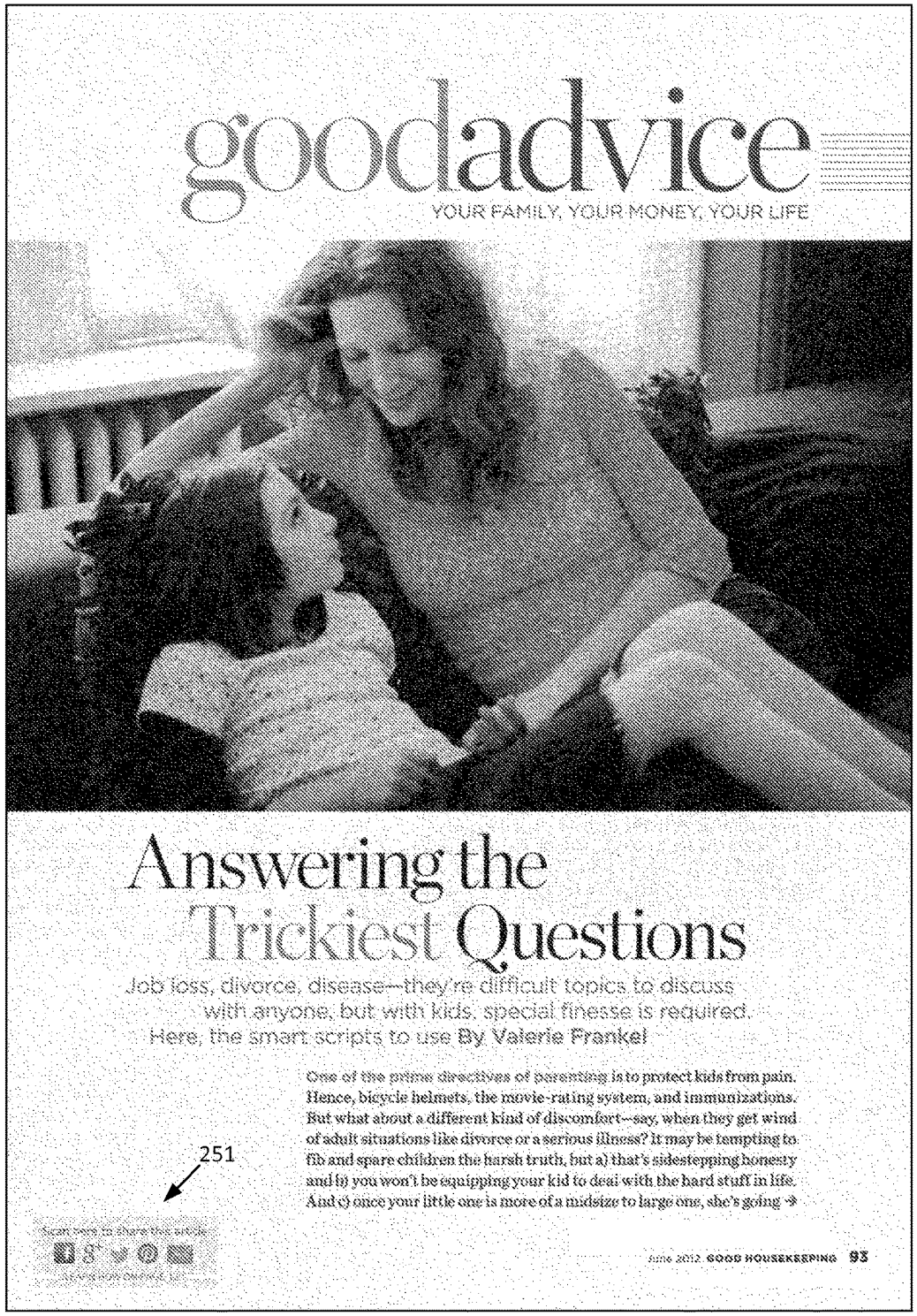
FIG. 25 shows a magazine article including a response indicia.

FIG. 25 shows the first page of an article of a magazine article entitled "Answering the Trickiest Questions," which addresses the topic of discussing difficult issues with children. In the lower corner is an exemplary response code 251 showing a particular form of implementation. The code is shown in larger form in FIG. 26. A variant form is shown in FIG. 27. (The additional logo in FIG. 27 indicates entry of comments about the article.)

As can be seen, the response code is not the uninformative black and write gridded pattern of a conventional machine readable code. Instead, the code includes text that the viewer can read ("Scan here to share this article"), and graphics that the viewer can recognize as logos of Facebook, Twitter, Pinterest, Google+ and email.

Not apparent to the viewer, however, is that the code also conveys a steganographic digital watermark. When sensed by a suitable smartphone app, the watermark causes the smartphone to load an HTML landing web page—such as that shown by FIG. 29.

Figure 28:
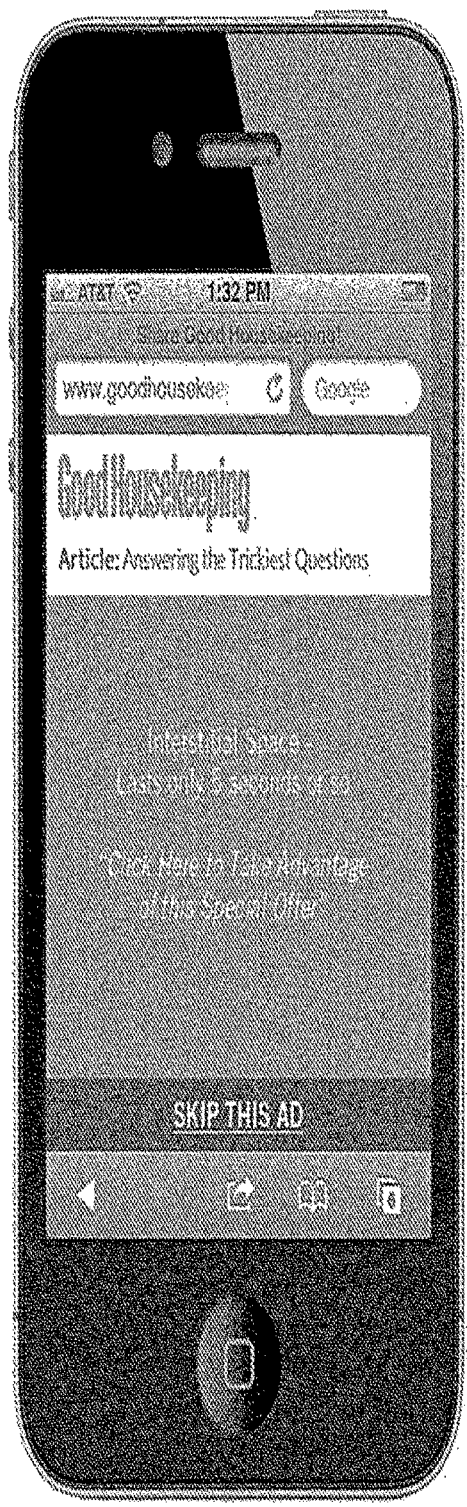

An interstitial advertisement page, such as shown by FIG. 28, may be presented while the landing page loads (or, if the landing page loads faster than, e.g., 1.5 seconds, then for a longer period specified by the publisher). The interstitial page has the same header as the landing page, providing a more seamless transition between FIGS. 28 and 29 to the viewer. This header includes both the brand of the magazine, and the title of the magazine article from which the code was scanned. In some embodiments the interstitial page is static—not clickable (e.g., saying simply "This share is brought to you by <sponsor, e.g., Good Housekeeping>")—to make sure the reader isn't side-tracked from reaching the FIG. 29 landing web page.

Figure 29:
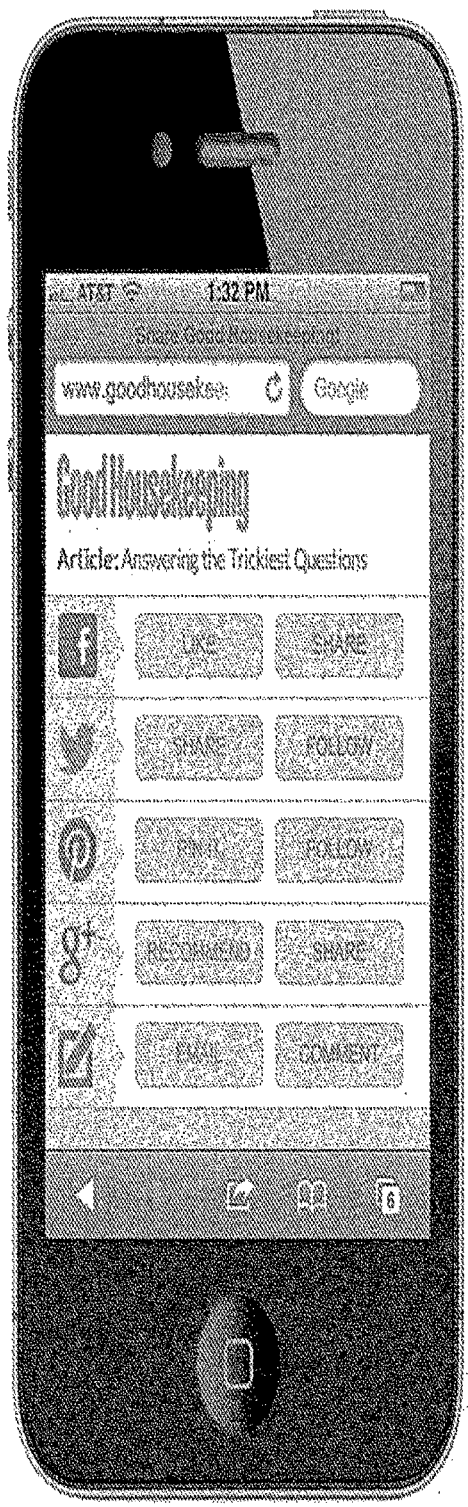

The FIG. 29 landing web page presents UI buttons that are selectable by the reader to share an online version of the magazine's "Answering the Trickiest Questions" article across multiple social networks. Other options are also available, including "liking" the article on Facebook, Twitter and Google+, pinning the article's artwork to Pinterest, sending an email to a friend with a link to the online copy of the article, and entering comments for presentation with the online copy of the article.

Figure 30:
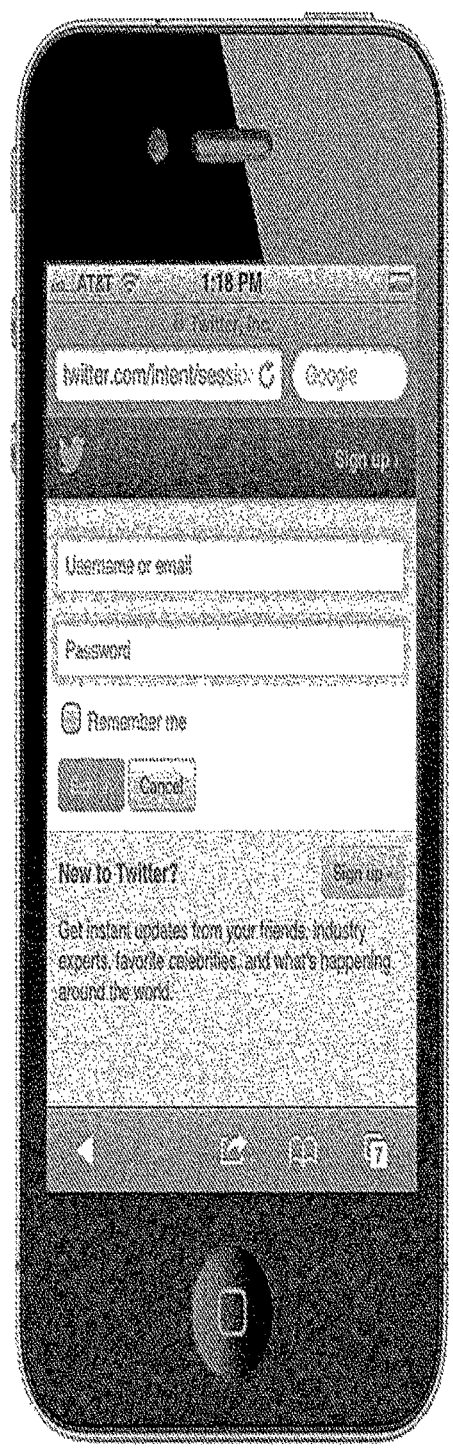
Figure 31:
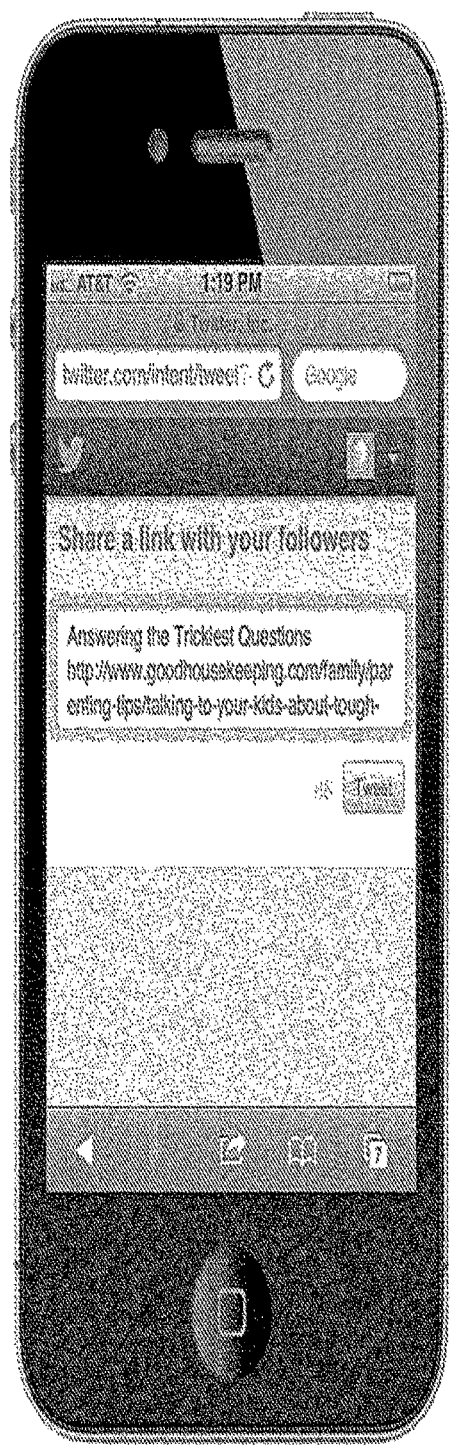

Selecting one of the "Share" buttons from the FIG. 29 page establishes the same connection to the chosen social network user interface as if a "Share" icon for that network had been clicked from the publisher's article web page. FIGS. 30 and 31 show an illustrative sequence of screens if the Twitter/Share button is selected. The first screen allows the reader to sign-in to Twitter. The second screen allows the reader to edit and send a Tweet containing the article link. (The FIG. 30 screen is skipped if the reader is already signed-into Twitter.)

If the reader's smartphone has a specialized app installed for the selected social network (e.g., a Facebook mobile app), then that app may be launched when the link is posted to that network.

Whenever the reader shares an article link using the detailed technology, information in addition to the URL can be provided. The name of the person, the name of the enabling service, and the name of the print magazine, can all be included in the shared information (e.g., "Linked by Alice Smith, via Sharemarc™, from Parents Magazine").

Figure 32:
FIGS. 28-32 depict screenshots from illustrative embodiments.

Selecting one of the "Follow" buttons from the FIG. 29 page leads to the publisher's page on the selected social network. FIG. 32 shows the result if the Pinterest/Follow button is selected: the Good Housekeeping magazine page on Pinterest loads. (In a variant embodiment, each article may have its own social network page—complete with the article text and associated comments. In still another embodiment, clicking the "Follow" button leads to the social network account of the article's author.)

Selecting a "Comment" button can trigger different actions, depending on implementation.

One implementation presents a new UI on the smartphone—with the same header as the previous pages, but inviting the reader to tap in a central area to enter a comment text (using an on-screen keyboard appears, as is familiar)—optionally with a user name/password. When the reader finishes typing the comment, and taps a Post button, the comment is sent to the magazine's web site, where it is added to public comments presented at the end of the online article. The comment entry UI disappears, and the smartphone next displays the comment section of the online article page, where the comment will soon appear.

Another implementation responds to the reader's tap of the "Comment" button by loading a web page displaying the online article, scrolled towards the end to the online form where public comments are entered. The reader can then review other readers' comments, and interact with the publisher's existing comment form to enter their own comments.

Some magazines provide a mobile Facebook comments app. This app can be launched by a tap to the FIG. 29 Comments button, to allow the reader to enter an article comment.

If the reader selects the Email button from FIG. 29, the reader's preferred email app opens, with a message draft that includes a link to the online article—poised for the reader to type an email address and send.

It will be recognized that the landing page shown in FIG. 29 is illustrative only. In other implementations, other layouts can be used, with more or less social networks, more or less sharing options, etc. In some implementations, all the landing pages for a particular magazine, or for a particular magazine issue, are actually the same page template, customized dynamically (e.g., using HTML5) to correspond to the particular response code involved. One particular approach has a simple configuration template associated with each issue, which identifies the article name, page number, machine readable code, online link URL, etc.

Figure 26:
FIGS. 26 and 27 show enlarged response indicia.
Figure 27:
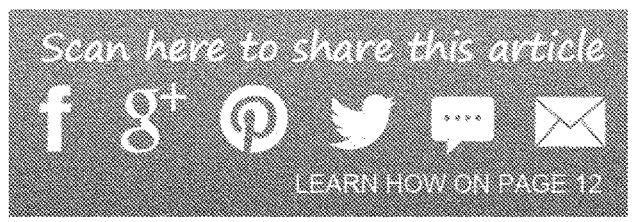

The codes shown in FIGS. 26 and 27 are similarly illustrative only; countless variations are possible (some devoid of social network icons). Desirably, however, the shape and graphic content of the codes are generally consistent within the magazine, and preferably are consistent between different magazines and even different publishers—to aid in public recognition. (Color might be changed as necessary, e.g., to conform to the magazine's signature colors, or for better presentation on the article's background color.)

As shown in FIG. 25, the preferred code is small enough to be easily placed on a printed page, but large enough to be noticeable by the reader. The size of the code is typically less than 2 inches in its maximum dimension, and may be less than 1.5, 1.1, 0.8, 0.6 or 0.4 inches in that dimension. The other dimension is smaller, such as by a factor of 2, 3, 4 or more. The depicted code is about 1.75 by 0.65 inches. Typically, the code is non-square, but it needn't be rectangular. For example, codes with one or more curves edges can be used.

Some implementations provide a reader history option than is UI-selectable by the reader from one or more of the app screens, to recall previous magazine code reads and shares. These can be organized, at the reader's election, by date, by magazine title, by article title, by network, etc. By recalling such history, the user can return to articles that were earlier of interest, and examine new comments, share with new friends, etc.

The above-described functionality can be provided by magazine-branding of a generic watermark-reading smartphone application. As another option, a watermark reader can be integrated into a magazine's existing mobile application.

The technology provides the publisher with a variety of real-time, online analytic reports and charts. These detail, for example, the number of times the printed code in each article was scanned, the number of times the article link was shared on each of the social networks, the traffic driven to the publisher from such sharing, the total shares and traffic for each article, the total shares and traffic for each network, the total shares and traffic for each article/network combination, details of the foregoing activity by geographic areas and by date/hour, and aggregate counterparts to the foregoing across all networks and across all articles in a particular print issue, all issues in a magazine brand, and all magazine brands owned by a publisher.

("Shares" in the foregoing refers to any event in which a reader taps one of the options on the landing page (e.g., Like, Share, Follow, Recommend, Email, Comment), and completes the action from the social network site. "Traffic" refers to events in which the reader clicks to link to the online article.)

Alternatively, or additionally, analytics available from Google can be employed. Similarly, analytics from the social networks (e.g., provided by the Facebook Open Graph API) can be used. These latter analytics allow tracking of, e.g., how many friends (in aggregate) were exposed to a shared link, how many people shared the article on the social network, how many of their friends were exposed to it, etc.

In this era that some decry as witnessing the demise of print media, the detailed technology provides many benefits to print publishers—among them: new advertising revenue streams, and exposure—by sharing—to new audience members (potentially leading to new print subscriptions). Moreover, while the print subscriber base for most magazine far out-numbers the digital reader base, the print side of the business has no detailed analytics to measure consumption of the content. The present technology provides a sampling of such previously-unavailable statistics. Such information can help publishers decide the type of content and coverage angles that should be pursued.

Other Arrangements

Still another application of the present technology is an image-based news feed. Pinterest or other social network can examine the geographic locations of members who are actively posting images, and identify those locations from which imagery is being posted at rates higher than statistical norms. Images posted by users in such location can be randomly selected (perhaps after some brief quality assurance metrics, such as sharpness analysis) and output to an image feed that other users can tune to and review. Such feed of imagery can be distributed by channels and means other than the social network(s) from which the images originated. For example, the image feed may be converted into an MPEG stream and distributed by YouTube and other video distribution services.

Instagram is a social network whose popularity resides, in part, on the easy application of filters to smartphone-captured images, to give them artsy effects. (The filters include X-Pro II, Lomo-fi, Earlybird, Sutro, Toaster, Inkwell, Walden, Hefe, Apollo, Poprocket, Nashville, Gotham, 1977, and Lord Kelvin. One converts the image colors to sepia; another adds a peripheral blurring vignette, etc.) Desirably, some or all of these filters also overlay a digital watermark pattern on the image. This watermark can encode an identifier of the user (e.g., their Instagram login, or their email address, etc.). That way, if an image is later repurposed or otherwise used in an unforeseen way, it can still be associated back with its the originating user.

Another technology involves smartphone-captured video. A software app examines the sequence of frames and selects representative keyframes. (A variety of techniques for keyframe selection are known. See, e.g., U.S. Pat. Nos. 5,995,095 and 6,185,363, and published application 20020028026.) The app presents these keyframes to the user, who selects one (or more). A user-selected filter is then applied to the image(s), e.g., in the manner of Instagram. Again, a watermark is added with the filter. The image (which may be termed a Photeo) is then uploaded to a social networking service, together with some or all of the video. Both are stored, and the image is presented with other images in the user's account (e.g., on a pinboard, etc.), from which it may be re-posted by the user or others to other locations, etc. When any copy of the image is later selected (e.g., tapped or clicked) by a viewer, the embedded watermark is desirably decoded and links to the full video, which is then rendered to the viewer.

In such arrangement, the image can be enjoyed just like any other image, but it also provides the added element of a video clip if someone so chooses to watch. Such functionality also persists through printing. That is, if the image is printed, and the print document is thereafter photographed by a smartphone, an app on the smartphone can again read the watermark and launch the linked video into playback. Postcards and print booklets can thus become memento portals through which people can experience video captured at weddings, parties, concerts, etc.

Other arrangements can involve both watermarking and fingerprinting.

Consider a magazine or newspaper article that is digitally watermarked (e.g., by background speckling, or by watermarking of an included image, etc.) and enrolled in the Digimarc Discover service (detailed, e.g., in application 20120284012). This service receives watermark payload data decoded by a Digimarc Discover app from a printed publication, and identifies a corresponding response that should be triggered by that watermark (e.g., linking to an online version of the article.)

The text of the watermarked article is obtained, and is enrolled in a fingerprint database—along with metadata for the article (e.g., title, author, publication name and date, etc.). This text can be obtained by loading it from a URL supplied by the publisher, which points to the text at its web site. (The URL may be indicated by the watermark payload data.) Alternatively, the text may be obtained from another repository—such as from the Digimarc Discover back end server.

The fingerprint can comprise scale invariant features (or other robust graphic features) of the text as laid out in a graphic representation of the distributed article. Alternatively, the fingerprint can comprise snippets of text (OCR'd if necessary) that can serve as quasi-unique identifiers for the article.

A web crawler then examines computer sites on the internet, using the fingerprint data and/or the associated metadata, to identify instances of where the article has been shared. Social networks, such as Facebook, can be checked for references to the article shared among members, using the Facebook API.

Demographic information is gleaned from the locations where the article or its associated metadata are found. For example, a particular article in House Beautiful may be discovered to be popular among women 14-18 years old, in the US Midwest. Another article may be posted to a web site that draws most of its traffic from residents of Jordan. The number of comments posted about the article, and sentiment analysis of same, provide additional information about the article's popularity and audience reaction.

(Although described in the context of printed articles, the same approach is useful with other media types.)

Other Comments

FIGS. 18-21 illustrate certain of the other aspects of the present technology.

The assignee's pending patent application Ser. No. 13/149,334, filed May 31, 2011 (now U.S. Pat. No. 8,842,875), Ser. No. 13/174,258, filed Jun. 30, 2011 (now U.S. Pat. No. 8,831,279), and Ser. No. 13/425,339, filed Mar. 20, 2012 (published as US 2013-0097630 A1), and published application 20100228632, detail technologies that are related to the presently-described technologies.

While certain arrangements involve imagery captured with a user's smartphone camera, this is not essential. For example, implementations of the present technology can utilize image data obtained otherwise, such as electronically transmitted from another source (e.g., a friend's smartphone), or obtained from the web.

Likewise, while software on the smartphone typically performs extraction of identification data from the image data in certain of the detailed arrangements, this, too, is not essential. For example, the phone can send the image data to a processor remote from the phone (e.g., at the social networking service or in the cloud), which can perform extraction of the image identification data. Or the extraction can be distributed, with initial phases of the process (e.g., filtering, and/or FFT transforming) performed on the handset, and latter phases performed in the cloud.

The focus of this disclosure has been on still imagery. But it will be recognized that the detailed technologies can likewise be employed with video and audio content.

Similarly, while many of the particular embodiments were described in connection with Pinterest, it will be recognized that such technologies can likewise be used in connection with other social networks.

It should be understood that features and arrangements detailed in connection with one embodiment can likewise be incorporated into other embodiments. Such combinations and permutations are not exhaustively detailed, as their implementation is straightforward to the artisan—based on this disclosure.

As noted earlier, the technology also finds application with barcodes. A barcode can be photographed with a smartphone, and its payload data can be decoded (either locally at the smartphone, or sent to another computer for decoding). The decoded barcode data is then used to access a product database to obtain information about the associated product. Once the product has been identified, the other detailed methods can be utilized.

While some embodiments involve watermarking each image in a magazine with a different watermark payload, this is not necessary. For example, all the images on a single page—or in a single article—can be watermarked with the same payload. When any of them is imaged by the user's smartphone, the smartphone app may recall pristine versions of all images on the page (or in the article), and present them as a gallery of thumbnails, from which the user can select the desired image. In some magazine articles, only a single image may be watermarked on each page, yet its capture by the smartphone camera will result in the system presenting thumbnails of all images on that page (or in that article).

In embodiments in which multiple related images are presented to the user, they needn't all be presented on a single screen (as in a grid layout). In other arrangements, a single image may be presented per-screen, and the user interface can allow transitioning to other images by swiping a finger across the screen, or by touching a Next button or the like.

While occasional reference has been made to layout, this term does not narrowly refer only to physical placement of one item (e.g., an image) relative to another on a page. Rather, it also encompasses aspects of structure, sequence and organization—reflecting associations between items, and the experiential flow towards which the publication subtly or overtly guides the user in navigating the publication.

Similarly, references to images, photos, and the like should not be narrowly construed. For example, a photo refers not just to a paper print of a picture, but also to the set of digital data by which the picture is represented.

Likewise, while reference has been made to "posting" images to a social networking service, it will be recognized that such posting need not involve transfer of image data. Instead, for example, the posting may comprise providing address data for the image—such as a URL. Posting encompasses the act of the user in directing the posting, and the act of the social networking service in effecting the posting. Many social networking services provide APIs to facilitate posting of data to the service using third party software.

Naturally, when reference is made to an item in the singular (e.g., "a photo"), it will be recognized that such description also encompasses the case of plural items.

When an image is identified, metadata associated with the image may be accessed to determine whether re-distribution of the image if permitted. Some image proprietors are eager to have their imagery re-distributed (e.g., promotional imagery for commercial products); others are not. The smartphone app can vary its behavior in accordance with such metadata. For example, if the metadata indicates that redistribution is not permitted, this fact may be relayed to the user. The software may then present alternate imagery that is similar (e.g., in subject matter or appearance) but is authorized for redistribution.

It will be recognized that product-identifying information may be determined from sources other than image data. For example, a product identifier may be read from an NFC (RFID) chip on a product, on a shelf display, or elsewhere, using the NFC reader provided in many smartphones.

Still further, acoustic identification may sometimes be used (e.g., ultrasonic signals, such as are used to identify retail stores to the ShopKick app). In such arrangements, a user's phone may detect a unique ultrasonic signature that is present in a home furnishings aisle at Macy's department store. The smartphone can use this information to determine the phone's location, which is then provided to a database that associates such location information with collections of images depicting nearby merchandise. These images may be presented on the smartphone display to the user, who may then elect to like one or more of these products, or post one or more of the images (or related images, discovered as described above) to the user's social network account as described above. (Shopkick's technology is further detailed in patent publication 20110029370.)

While reference was made to app software on a smartphone that performs certain of the detailed functionality, in other embodiments these functions can naturally be performed otherwise—including by operating system software on the smartphone, by a server at a social networking service, by another smartphone or computer device, distributed between such devices, etc.

While reference has been made to smart phones, it will be recognized that this technology finds utility with all manner of devices—both portable and fixed. PDAs, organizers, portable music players, desktop computers, laptop computers, tablet computers, netbooks, wearable computers, servers, etc., can all make use of the principles detailed herein. Particularly contemplated smart phones include the Apple iPhone 4s, and smart phones following Google's Android specification (e.g., the Motorola Droid 4 phone). The term "smart phone" should be construed to encompass all such devices, even those that are not strictly-speaking cellular, nor telephones (e.g., the Apple iPad device).

(Details of the iPhone, including its touch interface, are provided in Apple's published patent application 20080174570.)

While many of the illustrative embodiments made reference to digital watermarking for content identification, in most instances fingerprint-based content identification can be used instead.

The techniques of digital watermarking are presumed to be familiar to the artisan. Examples are detailed, e.g., in Digimarc's U.S. Pat. No. 6,590,996 and in published application 20100150434. Similarly, fingerprint-based content identification techniques are well known. SIFT, SURF, ORB and CONGAS are some of the most popular algorithms. (SIFT, SURF and ORB are each implemented in the popular OpenCV software library, e.g., version 2.3.1. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv:0804.4457, 2008.) Use of such technologies to obtain object-related metadata is likewise familiar to artisans and is detailed, e.g., in the assignee's patent publication 20070156726, as well as in publications 20120008821 (Videosurf), 20110289532 (Vobile), 20110264700 (Microsoft), 20110125735 (Google), 20100211794 and 20090285492 (both Yahoo!).

Linking from watermarks (or other identifiers) to corresponding online payoffs is detailed, e.g., in Digimarc's U.S. Pat. Nos. 6,947,571 and 7,206,820.

Additional work concerning social networks is detailed in Digimarc's patent application Ser. No. 13/425,339, filed Mar. 20, 2012 (published as US 2013-0097630 A1).

The camera-based arrangements detailed herein can be implemented using face-worn apparatus, such as augmented reality (AR) glasses. Such glasses include display technology by which computer information can be viewed by the user—either overlaid on the scene in front of the user, or blocking that scene. Virtual reality goggles are an example of such apparatus. Exemplary technology is detailed in U.S. Pat. No. 7,397,607 and 20050195128. Commercial offerings include the Vuzix iWear VR920, the Naturalpoint Trackir 5, and the ezVision X4 Video Glasses by ezGear. An upcoming alternative is AR contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

The design of smart phones and other computer devices referenced in this disclosure is familiar to the artisan. In general terms, each includes one or more processors (e.g., of an Intel, AMD or ARM variety), one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, 3-axis gyroscopes, a microphone, etc., together with software instructions for providing a graphical user interface), interconnections between these elements (e.g., buses), and an interface for communicating with other devices (which may be wireless, such as GSM, CDMA, 4G, W-CDMA, CDMA2000, TDMA, EV-DO, HSDPA, WiFi, WiMax, mesh networks, Zigbee and other 802.15 arrangements, or Bluetooth, and/or wired, such as through an Ethernet local area network, a T-1 internet connection, etc).

More generally, the processes and system components detailed in this specification may be implemented as instructions for computing devices, including general purpose processor instructions for a variety of programmable processors, including microprocessors, graphics processing units, digital signal processors, etc. These instructions may be implemented as software, firmware, etc. These instructions can also be implemented to various forms of processor circuitry, including programmable logic devices, FPGAs, FPOAs, and application specific circuits—including digital, analog and mixed analog/digital circuitry. Execution of the instructions can be distributed among processors and/or made parallel across processors within a device or across a network of devices. Transformation of content signal data may also be distributed among different processor and memory devices.

Software instructions for implementing the detailed functionality can be readily authored by artisans, from the descriptions provided herein, e.g., written in C, C++, Visual Basic, Java, Python, Tcl, Perl, Scheme, Ruby, etc. Mobile devices according to the present technology can include software modules for performing the different functions and acts.

Commonly, each device includes operating system software that provides interfaces to hardware resources and general purpose functions, and also includes application software which can be selectively invoked to perform particular tasks desired by a user. Known browser software, communications software, photography apps, and media processing software can be adapted for many of the uses detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

In the interest of conciseness, the myriad variations and combinations of the described technology are not cataloged in this document. Applicants recognize and intend that the concepts of this specification can be combined, substituted and interchanged—both among and between themselves, as well as with those known from the cited prior art. Moreover, it will be recognized that the detailed technology can be included with other technologies—current and upcoming—to advantageous effect.

To provide a comprehensive disclosure, while complying with the statutory requirement of conciseness, applicants incorporate-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The invention claimed is:

1. A method comprising:
receiving first imagery captured by a smartphone camera, the first imagery representing a first retail product located at a retail location, and presenting the first imagery on a touch screen of the smartphone;
providing the first imagery to a processor to produce fingerprint data therefrom, the fingerprint data being utilized to identify the first retail product;
receiving second imagery representing a second retail product, identified as a product recommendation associated with the first retail product, the second imagery being sourced from a source different than the smartphone camera;
presenting, on the touch screen of the smartphone, the second imagery;
broadcasting the fingerprint data for access by a retail location only when a global positioning system provides location information indicating that the smartphone is within an area associated with the retail location, whereby battery life of the smartphone is perserved relative to continuous or periodic broadcasts of the fingerprint data, in which the retail location consults a translation table structure to obtain a corresponding identifier;
receiving an in-stock indication from the retail location for a product associated with the corresponding identifier.

2. The method of claim 1 further comprising initiating an online posting of the first imagery for viewing by others.

3. The method of claim 1 in which the second retail product is identified, at least in part, based on information associated with a user of the smartphone.

4. The method of claim 1 further comprising: receiving third imagery, the third imagery being sourced from a source different than the smartphone camera, in which the third imagery comprises one or more alternative images of the first retail product.

5. A smartphone comprising:
a touchscreen display;
a camera for capturing imagery including video;
one or more electronic processors programmed for:
handling first imagery captured by said camera, the first imagery representing a first retail product located at a retail location;
controlling presentation of the first imagery on said touchscreen display;
producing fingerprint data from the first imagery, the fingerprint data being utilized to identify the first retail product;
controlling receipt of second imagery representing a second retail product, identified as a product recommendation associated with the first retail product, the second imagery being sourced from a source different than said camera;
controlling presentation of the second imagery on said touchscreen display;
receiving user input entered via said touchscreen display;
as a consequence of the user input, initiating an action comprising controlling presentation of a monocle view on said touchscreen display, the monocle view comprising an overlay of graphical imagery on live video captured by said camera such that when said smartphone points in different directions, the graphical imagery shows what social network posts people have made in different directions relative to a current location associated with said smartphone, in which at least one instance of graphical imagery includes digital watermarking encoded therein, the digital watermarking comprising an identifier associated with a person who first posted the one instance of graphical imagery; and
decoding the digital watermarking from the one instance of graphical imagery to obtain the identifier.

6. The smartphone of claim 5 in which the action further comprises initiating an online posting of the first imagery or the second imagery for viewing by others.

7. The smartphone of claim 5 in which the action further comprises initiating an online purchase of the second retail product.

8. The smartphone of claim 5 in which the action further comprises a request for directions within the retail location to a location at which the second retail product is located.

9. The smartphone of claim 8 in which the directions are determined, at least in part, based on radio frequency signals emitted from the smartphone.

10. The smartphone of claim 5 in which the action further comprises a request for pricing of the second retail product from multiple, different sources.

11. The smartphone of claim 5 in which the second retail product is identified, at least in part, based on information associated with a user of the smartphone.

12. The smartphone of claim 5 in which said one or more electronic processor are programmed for: controlling receipt of third imagery, the third imagery being sourced from a source different than said camera, in which the third imagery comprises one or more alternative images of the first retail product.

13. The smartphone of claim 12 in which the action further comprises initiating an online posting of the one or more alternative images for viewing by others.

14. The smartphone of claim 5, further comprising a gyroscope for providing direction information, in which said smartphone utilizes the direction information to determine whether it's being pointed in the different directions.

15. The method of claim 1 further comprising:
receiving user input via the touch screen of the smartphone; and
as a consequence of said user input, initiating an action comprising an online posting of the second imagery for viewing by others.

16. The method of claim 15 further comprising initiating an online posting of the one or more alternative images for viewing by others.

17. The method of claim 1 further comprising:
receiving user input via the touch screen of the smartphone; and
as a consequence of said user input, initiating an action comprising an online purchase of the second retail product.

18. A client device comprising:
a camera for capturing imagery;
a global positioning system (GPS);
a touchscreen display;
a battery for powering said client device;
a transceiver; and
one or more processors programmed for:
controlling presentation of first imagery captured by said camera on said touchscreen display, in which the first imagery represents a first retail product located at a retail location;

generating fingerprint data from the first imagery, the fingerprint data being utilized to identify the first retail product;

obtaining second imagery representing a second retail product, identified as being associated with the first retail product, the second imagery being sourced from a source different than said camera;

controlling presentation of the second imagery on said touchscreen display;

controlling said transceiver to broadcast the fingerprint data for receipt by the retail location only when said GPS provides location information indicating that the client device is within an area associated with the retail location, whereby battery life of said battery is persevered relative to continuous or periodic broadcasts of the fingerprint data, in which the retail location consults a translation table structure to obtain a corresponding identifier; and receiving an alert communicated from the retail location, the alert providing an in-stock indication for a product associated with the corresponding identifier.

19. The client device of claim 18 in which said one or more processors are programmed for initiating an online posting of the first imagery for viewing by others.

20. The client device of claim 18, in which said one or more processors are programmed for: as a consequence of receiving user input via said touchscreen display, initiating an action comprising an online posting of the second imagery for viewing by others.

21. The client device of claim 18, in which said one or more processors are programmed for: as a consequence of receiving user input via said touchscreen display, initiating an action comprising an online purchase of the second retail product.

22. The client device of claim 18 in which said one or more processors are programmed for: receiving third imagery, the third imagery being sourced from a source different than said camera, in which the third imagery comprises one or more alternative images of the first retail product.

23. The client device of claim 22 in which said one or more processors are programmed for: initiating an online posting of the one or more alternative images for viewing by others.

24. The client device of claim 18 in which said client device comprises a smartphone, tablet or laptop; and in which said transceiver comprises a radio frequency transceiver.

* * * * *